United States Patent [19]
Huxley et al.

[11] Patent Number: 6,134,547
[45] Date of Patent: Oct. 17, 2000

[54] COMPUTERIZED METHOD AND SYSTEM FOR USER-INTERACTIVE, MULTIMEDIA CATALOGUING, NAVIGATION AND PREVIEWING OF FILM AND FILMS ON VIDEO

[75] Inventors: Mark T. Huxley; Paul F. Zullo, both of Brooklyn; Paul Rosovsky, Queens; Jef R. Armstrong, Brooklyn; Judith A. Israel, New York, all of N.Y.

[73] Assignee: Muze, Inc., New York, N.Y.

[21] Appl. No.: 08/725,841

[22] Filed: Sep. 30, 1996

Related U.S. Application Data

[63] Continuation of application No. 08/273,449, Jul. 11, 1994, abandoned.

[51] Int. Cl.$^7$ .................................................... G06F 17/30
[52] U.S. Cl. ................................ 707/5; 707/6; 707/104; 345/962; 345/968
[58] Field of Search .................................. 395/216, 226, 395/227, 601, 603, 604, 605, 606, 612, 615, 326; 345/326, 962, 968; 705/1, 16, 26, 27; 707/1, 3, 4, 5, 6, 100, 101, 104, 2, 7

[56] References Cited

U.S. PATENT DOCUMENTS

| | | | |
|---|---|---|---|
| 5,241,671 | 8/1993 | Reed et al. | 707/104 |
| 5,297,249 | 3/1994 | Bernstein et al. | 345/356 |
| 5,319,740 | 6/1994 | Yamada et al. | 706/59 |
| 5,428,731 | 6/1995 | Powers, III | 707/501 |
| 5,434,678 | 7/1995 | Abecassis | 386/52 |

OTHER PUBLICATIONS

Banet, Bernard, "CD–ROM encyclopedias;multimedia approach to electronic references", Seybold Report on desktop publishing, v8, n2, p. 3–17, Aug. 4, 1993.

Little et al., "A digital On–Demand Video Service Supporting Content–Based Queries", Proceedings of the ACM Multimedia '93, Aug. 1993, p. 427–436.

Staff, "VTLS Installs Multimedia InfoStation for Public Access at the NAL", Information Today, v10 n7 p. 25, Jul./Aug. 1993.

Banet, Bernard, "Progress in CD–ROM Publishing:a look at New Tools and Titles", Seybold Report on Desktop Publishing, v8, n8, p. 15–25, Apr. 1994.

(List continued on next page.)

*Primary Examiner*—Ulka Chauhan
*Attorney, Agent, or Firm*—Brown Raysman Millstein Felder & Steiner LLP

[57] ABSTRACT

The present invention relates to computerized methods and systems for user-interactive, multimedia cataloguing, navigation, the performance of data retrieval and previewing of films and videos. The system comprises an IBM compatible computer, with an Intel 486DX2/66 or higher based CPU, 8 megabytes random access memory, 270 megabyte hard drive and an internal cache for speed. One or more double-spin CD-ROM Drives are used for storage of cover art and film trailers and a full-motion video board with MPEG-1 compression and 16-bit digital sound processing and a touch-screen color monitor. The system is placed in video stores, and the like. Users are potential purchasers of the videos. The system's powerful, but easy to use graphical user interface, quickly leads the user to the desired film or video, wherein the user can read synopses, notes and reviews about the film or video, observe the associated cover art, and in certain instances, say, for about the most current 50-or-so films and videos, view their associated trailers—in full sound and quality video. The system can print out information identifying the chosen film and video for presentation to the store's clerk to aid in purchasing same.

12 Claims, 30 Drawing Sheets

(30 of 30 Drawing Sheet(s) Filed in Color)

Microfiche Appendix Included
(17 Microfiche, 828 Pages)

OTHER PUBLICATIONS

Trivette, Don "Electronic Encyclopedias merge text, high-–res visuals, and sound", PC Magazine, v9, n16, p. 537–538, Sep. 1990.

Tiampo, Janet M. "Update on Retrieval Software Products" Optical Information Systems, v8, n2, p. 86–88, Mar.–Apr. 1988.

Paske, Richard, "Hypermedia; a progress Report part 3:CD–ROM, CD–I, DVI, etc." THE Journal, v18, n3, p. 93–97, Oct. 1990.

Desmarals, Norman, "Microsoft's Encarta:an Encyclopedia that entertains while it Teaches", CD–ROM World, v8, n6, p. 51–54, Jul. 1993.

Ripley, G.David, "DVI–a digital Multimedia Technology", Communications of the ACM, v32, n7, p. 811–823, Jul. 1989.

"VTLS Installs Multimedia Infostation At National Agricultural library", Worldwide Videotex, v5, n7, Jul. 1993.

'NAL Gets "Scholar's Workstation"', Worldwide Videotex, v12, n8, Aug. 1993.

*Information Retrieval—Data Structures and Algorithms*, W.B. Frakes, Ed., pp. 275–282 (Prentice Hall, New Jersey 1992).

COMPUTERIZED METHOD AND SYSTEM FOR USER-INTERACTIVE, MULTIMEDIA CATALOGUING, NAVIGATION AND PREVIEWING OF FILM AND FILMS ON VIDEO

CROSS REFERENCE TO RELATED APPLICATIONS

This application is a continuation of copending U.S. patent application Ser. No. 08/273,449, filed on Jul. 11, 1994, now abandoned.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

A microfiche appendix, consisting of seventeen sheets, listing the computer source code referred to herein is available separately. The microfiche appendix is incorporated as part of the present disclosure.

BACKGROUND OF THE INVENTION

1. Field of the Invention

Computerized methods and systems for user-interactive, multimedia cataloguing, navigation and previewing of films and films on video.

2. Description of the Prior Art

It is an object of the present invention to provide cost-effective computer-implemented methodologies and systems for cataloguing, navigating, performing data retrieval and previewing of clips of films and videos, in general, and films on video arid at the point-of-sale, in particular. Other embodiments of the present invention can be used on-line or in the home.

User-interactive, point of sale, preview systems for music on audio compact discs (CDs), with varying degrees of multimedia interfaces, are known, see, for example, U.S. Pat. No. 5,084,768 (CD listening along with viewing of associated "MTV" or other full-motion video presentations) and U.S. Pat. No. 5,237,157 (CD listening booth).

CD-ROM based movie databases are also known. While "Microsoft Cinemania 1994" a product of Microsoft Corp. of Redmond, Washington, permits the user to view 20 clips of classic films, about 900 movie stills, 150 dialogue audio clips, 100 music clips, 4,000 biographies, and almost 23,000 articles and film reviews, its database and navigation functions are limited, the video clips jerky and it is intended for home use. Another CD-ROM movie database intended for home use is "Mega Movie Guide" a product of Infobusiness Inc. of Orem, Utah. Again, though it offers about two-hours of full-sound, full-motion clips (about 127 clips from about 30 movies), 5,800 thumbnail movie reviews, profiles and still photographs of movie stars, Academy Award trivia, like Microsoft Cinemania 1994, it also is intended for personal use, and its database and navigation functions are limited.

Unfortunately, current video information lookup systems suffer from poor navigation strategies, which result in either providing users with large, ungainly result lists from which they have choose by scrolling through the list, or giving them an unsatisfactory response that "No Match Is Found."

It is an object of the present invention to provide data structure relations conducive to intuitive and hence easy-to-use navigation of a film and video database.

It is an object of the present invention to make learning about film and video a more transparent, simple and entertaining process.

It is a further object of the present invention to provide an economically feasible, point-of-sale system, while maintaining relatively short navigation and display times.

It is a further object of the present invention to permit the user to perform combination searches on a plurality of search items.

It is a still further object of the present invention to provide a multimedia, point-of-sale system, whereat the user may efficiently and easily search through a film and video database and selectively obtain written, aural and visual information regarding films and videos.

SUMMARY OF THE INVENTION

The present invention relates to computerized methods and systems for user-interactive, multimedia cataloguing, navigation, performing data retrieval and previewing of clips of films and videos. The system comprises an IBM-compatible computer, with an Intel 486DX2/66 or higher-based CPU, 8 megabytes random access memory, 270 megabyte hard drive and an internal cache for speed. One or more double-spin CD-ROM Drives are used for storage of cover art and film trailers and a full-motion video board is used that allows playback of 30-frame-per-second film sequences with MPEG-1 compression and 16-bit digital sound processing and a touch-screen color monitor. The system's data input interface provides a very efficient method for ensuring that all necessary information is entered in the proper location in the database in as short a time as possible.

The system is placed in video stores, and the like. Users are potential purchasers of the videos. Its powerful but easy-to-use graphical user interface, and associated sophisticated relational database, quickly lead the user to the desired film or video, wherein the user can read synopses, notes and reviews about the film or video, observe the associated cover art, and in certain instances, say, for about the most current 50-or-so films and videos, view their associated trailers—in full sound and realistic video. The system can print out information identifying the chosen film and video for presentation to the store's clerk to assist in purchasing same.

Or the system, if appropriately connected to the store's register, etc., can tell the user whether or not a particular video is in stock, or order the product directly from the store's inventory, or from third parties and in certain instances even complete the purchase. The system can also custom tailor a list of videos to the user's personal taste and interests. The system can also keep track of users' preferences both individually and by film and/or video. It is expected that use of the system will lead to increased video sales.

The present invention is an interactive electronic catalogue of substantially the entire spectrum of home video product currently available for sale in the United States. It reflects an approach to computer technology that considers such technology as a collection of tools to assist a wide range of users to gain access to information that will help them become knowledgeable about the video product available to them and thus be able to make informed decisions based on that knowledge. Through the use of relational database structures and multimedia technology, the present invention makes learning about film and video a more transparent, simple and entertaining process.

BRIEF DESCRIPTIONS OF THE DRAWINGS

The file of this patent contains at least one drawing executed in color. Copies of this patent with color drawings will be provided by the U.S. Patent and Trademark Office upon request and payment of the necessary fee.

FIGS. 1 and 2 exemplify different introductory screen displays of the present invention.

FIGS. 3 through 13 exemplify navigation through the system of the present invention wherein the initial entry into the system's database is via the release title or any other titles of any film or video in the database.

FIGS. 14 through 27 exemplify navigation through the system of the present invention wherein the initial entry into the system's database is via the category, genre or type of film or video in the database.

FIGS. 28 through 32 exemplify navigation through the system of the present invention wherein the initial entry into the system's database is via the subjects, topics or other keywords associated with the film or video in the database.

FIGS. 33 through 41 exemplify navigation through the system of the present invention wherein the initial entry into the system's database is via the name or names of any person or group of people receiving credit for a significant involvement in a film or video in the database.

FIGS. 42 through 54 exemplify navigation through the system of the present invention wherein the initial entry into the system's database is via the name or names of any award and the particular categories of the awards associated with a film or video in the database.

FIGS. 55 through 59 exemplify navigation through the system of the present invention wherein the initial entry into the system's database is via ratings associated with a film or video in the database.

DESCRIPTION OF THE PREFERRED EMBODIMENTS

Figure 1:
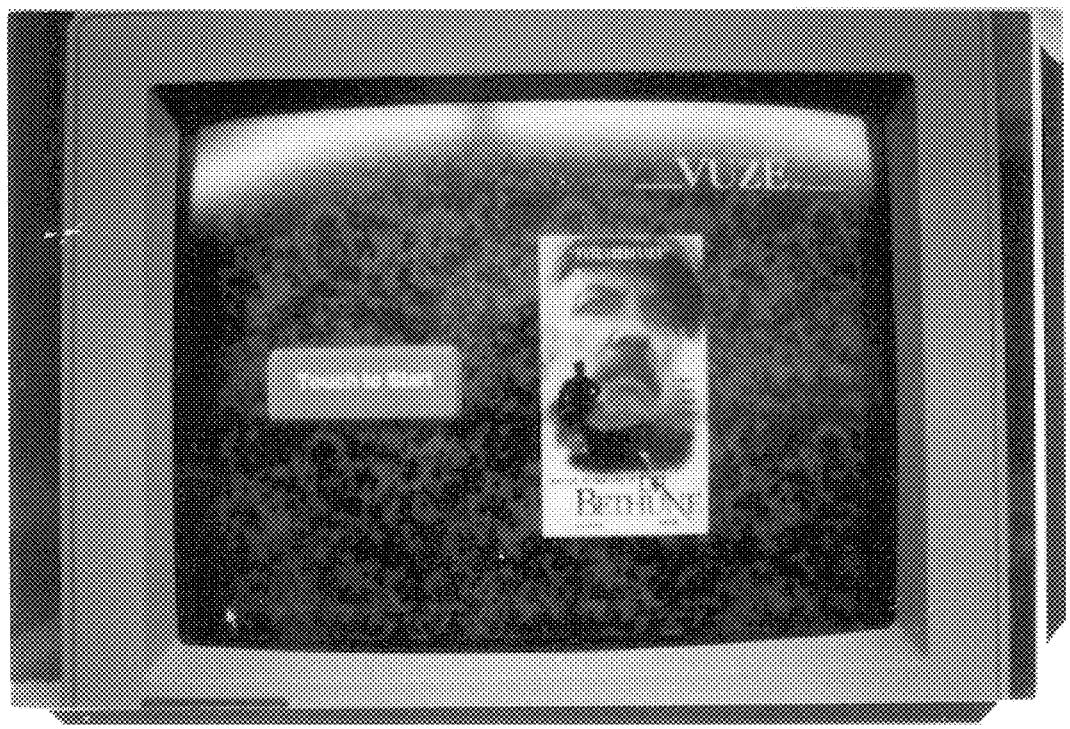
Figure 59:
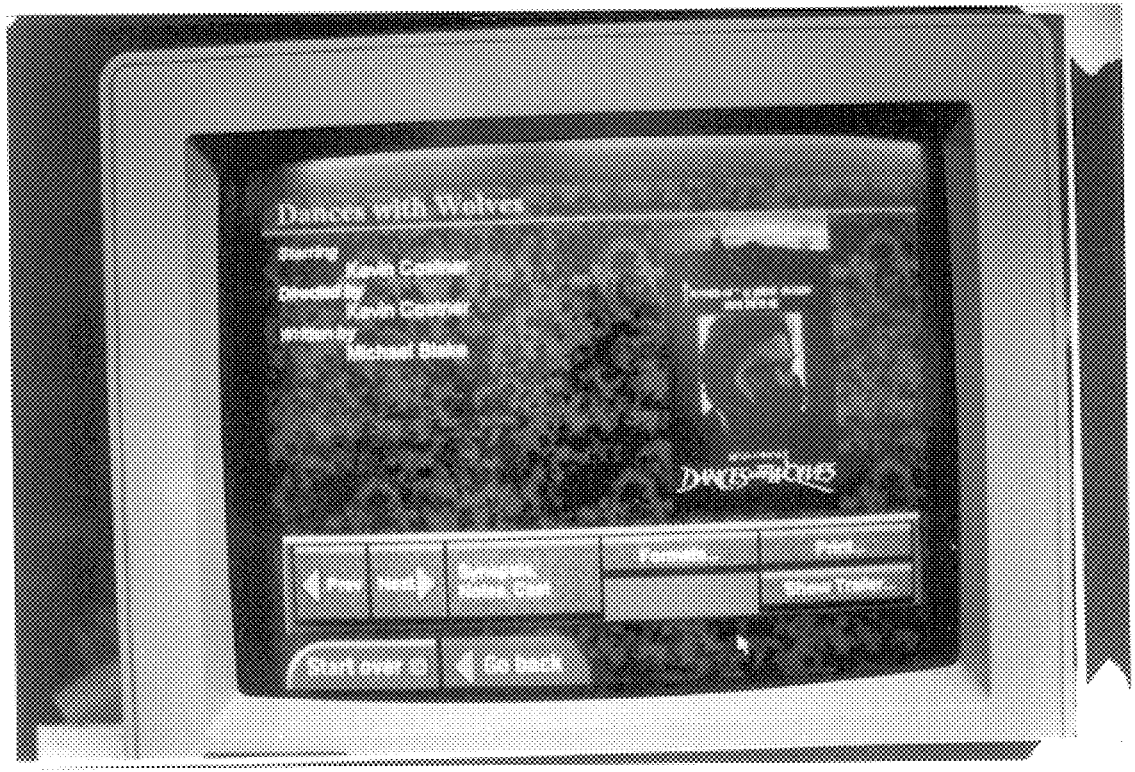

The following is a description of one preferred embodiment of the present invention. System navigation drawings in the form of computer screen images made in accordance with one embodiment of the present invention are shown in FIGS. 1–59. The computer software source code developed by applicants for a preferred embodiment of the present invention appears in the Microfiche Appendix.

In accordance with one embodiment of the present invention, a combination of hardware and software using commercially available products including an Intel-based CPU system, several different compression-decompression algorithms in combination to store and retrieve data, quality graphics and full-motion video, was found to be capable of the required database power and flexibility as well as the multimedia manner of presentation a system in accordance with the present invention requires. The foregoing was organized, accessed and displayed through applicants' own database engine, developed using Microsoft Corp.'s "Fox-Pro for Windows". The following commercially available hardware and software products may be used to practice the present invention.

An Intel 486DX2/66 or higher based CPU, such as International Business Machines Corporation's (IBM's) ValuePoint "Rocket" CPU or Dell Computer Corporation of Austin, Texas (DELL) 466/LV CPU, with 8 megabytes random access memory, 270 megabyte hard drive, 128 kilobyte internal cache (Dell) or 256 kilobyte internal cache (IBM). In one preferred embodiment, two double-spin CD-ROM Drives with a small computer system interface (SCSI). A full-motion video board that allows playback of 30-frame-per-second film sequences with Motion Picture Experts Group-1 (MPEG-1) compression and 16-bit digital sound processing, such as "Sigma Designs ReelMagic", with a SCSI interface, made by Sigma Designs Inc. of Fremont, Calif. A touch-screen monitor such as the "Touch-Monitor" by Elo TouchSystems, Inc. of Oakridge, Tenn. Industry standard keyboard and mouse for installation and maintenance purposes.

Operating systems and graphical user interfaces, such as Microsoft's MS-DOS 6.2 (for Dell) or IBM's PC-DOS 6.3 (for IBM), Microsoft's "Windows 3.1" and relational database such as Microsoft's "FoxPro for Windows 2.6". A spell checker for the relational database, such as "FoxSpell Checker" distributed by Strategic Edge of San Francisco, Calif. Fractal still image compression and decompression software, such as "ColorBox Pro 3.0" distributed by Iterated Systems, Inc. of Norcross, Ga. Software to allow database applications to perform database searches based on incomplete or misspelled queries, such as "PhDbase III (V.3.02)" distributed by Korenthal Associates, Inc. of New York, N.Y.

The method and system of the present invention must provide quick and easy (albeit powerful) access to a large quantity and range of data about film and video. In accordance with the present invention, it is based on a navigational metaphor that is intuitive and easy-to-use, while at the same time capable of allowing "power users" and store personnel to perform any of a number of combination lookups and queries, the structures of many of which may not be easily foreseeable. Therefore, the method and system allows as wide a range of combination searches as the data allows and was purposefully designed not to be limited to Applicants' idea of the searches that would be expected.

Finally, the present invention, in order to be a superior point-of-sale marketing tool for an industry dependent on visual images, sound and "glitz," utilizes high-quality graphics of cover art as well as the highest-quality full-motion digitized video generally available. Applicants discovered that a combination of fractalized compression for still images (using Iterated Systems, Inc.'s fractal compression technology) and MPEG-1 video compression for full-motion video (using Sigma Designs Inc.'s "ReelMagic" board and an MPEG compression-decompression algorithm (codec) for converting video and/or sound into digital code and vice versa. With the foregoing, Applicants were able to get the full-motion video and still graphics to co-exist in 35,000 and 64,000 colors, respectively. Of course this does not mean that other equipment which efficiently provides graphically superior means for compressing and storing full-motion video cannot also be used in practicing the present invention.

Internal Data Structures, Output and Memory Procedures

So that users are able to access data in as flexible a manner as possible, systems made in accordance with the present invention utilize specific computerized information storage methodologies and procedures to provide for ease in information manipulation and efficiencies in information storage. These methodologies include, but are not limited to:

1. Names are stored forwards and backwards, to facilitate lookups, that is, "FirstName LastName" as well as "LastName, FirstName".

2. Data (such as names, companies, titles, genres, keywords, formats) are only stored once in the system, and are accessed through a system of pointers, resulting in a very efficient storage of such data.

3. The data are structured so that multiple entries are possible in almost all fields. Through this manner of organization, each and every record may contain links to multiple names, multiple titles, multiple genres, multiple keywords, multiple formats, etc.

So that users of the computerized system have the greatest likelihood of finding the information for which they are looking, the present invention utilizes specific search and navigation methodologies. These methodologies include, but are riot limited to:

1. A "Search Procedure" providing that users will always get a match to their query. This enables users who may not be completely certain of all the terms of their search to have the system provide a way to winnow back their search terms until some sort of match is found. This overcomes the unsatisfactory state of some current video lookup systems, which either provide users with large, ungainly result lists from which they have to choose by scrolling through the list, or gives them a response that "No Match Is Found."

2. The system should allow for users to search for any word or combination of words in a title, or elsewhere, unlike other systems that require users to input a string of terms from left to right. Moreover, the system is designed to ensure that users will get a response that approximates at least some of their search terms. This is accomplished by the use of software developed by Applicants (see, 05SETUP.PRE, MICROFICHE APPENDIX, I.B.5) that expands the capability of PhDBase, referenced earlier, whereby every single word in the titles database is indexed. 05SETUP.PRE (MICROFIFHE APPENDIX, I.B.5) then performs a Boolean operation, by which it "ands" any terms that a user inputs to generate a result. If no result is thus generated, the program "ors" the terms to find every title containing either term. And if that fails to produce a result, the program performs a seek into the FoxPro-stored titles database 05SETUP.PRE (MICROFICHE APPENDIX, I.B.5.) on the text input by the user, and if there is still no result, winnows back the search term(s) one character at a time, until a match is produced. In accordance with the present invention, the above-described process is transparent to the user.

3. The "Procedure Stack" program (PUSH_STK.PRE, MICROFICHE APPENDIX, I.E.) enables the system to provide virtually unlimited reads, overcoming a limitation of FoxPro 2.6, which can currently nest only five reads. In order to accommodate the unlimited level of reads required by the present invention (especially the recursive use of the same screens at different points in the navigational process, using different data each time), the "Procedure Stack" program does not nest reads. Instead, as the user goes through the various screens, the program pushes the previous screen onto a stack, closes that screen and goes onto another screen. At any point, however, when a previously displayed screen is required, it can be retrieved from the stack.

4. The system of the present invention, through its use of bitmaps, is able to efficiently store and retrieve data without the need to resort to indexes. The WBIT.C (MICROFICHE APPENDIX, II.A.2.) program generates a bitmap for each term that may be looked up, and then attaches to that term a bitmap of all related records. With this technique, the system can pull out thousands of matches instantly (without the need for indexes and index searches). It is also possible to "and" or "or" any two (or more) bitmaps and get a resulting set with no significant degradation in access time.

The present invention also makes use of a number of techniques to optimize the use of system memory.

1. When searching any term in a large database (for example, a name in the names database), the programs found in the MICROFICHE APPENDIX at I.C. are used to read into memory only the data that is required for that immediate screen display. This not only saves memory but is considerably faster that using FoxPro's "Browse" function.

2. The present invention uses the WBIT.C, MICROFICHE APPENDIX, II.A.2. to work around another limitation of FoxPro 2.6, which does not release the memory it takes to perform a "Replace a Record" operation. Within the confines of FoxPro, one cannot get that memory back for system use. Applicants' system is able to replace a record without losing any memory to the operation by opening the database as a DOS file, writing the specific records to be replaced out, and then updating the header part of the FoxPro file.

Navigational Outline

Touch-to-Start Screen

Figure 2:
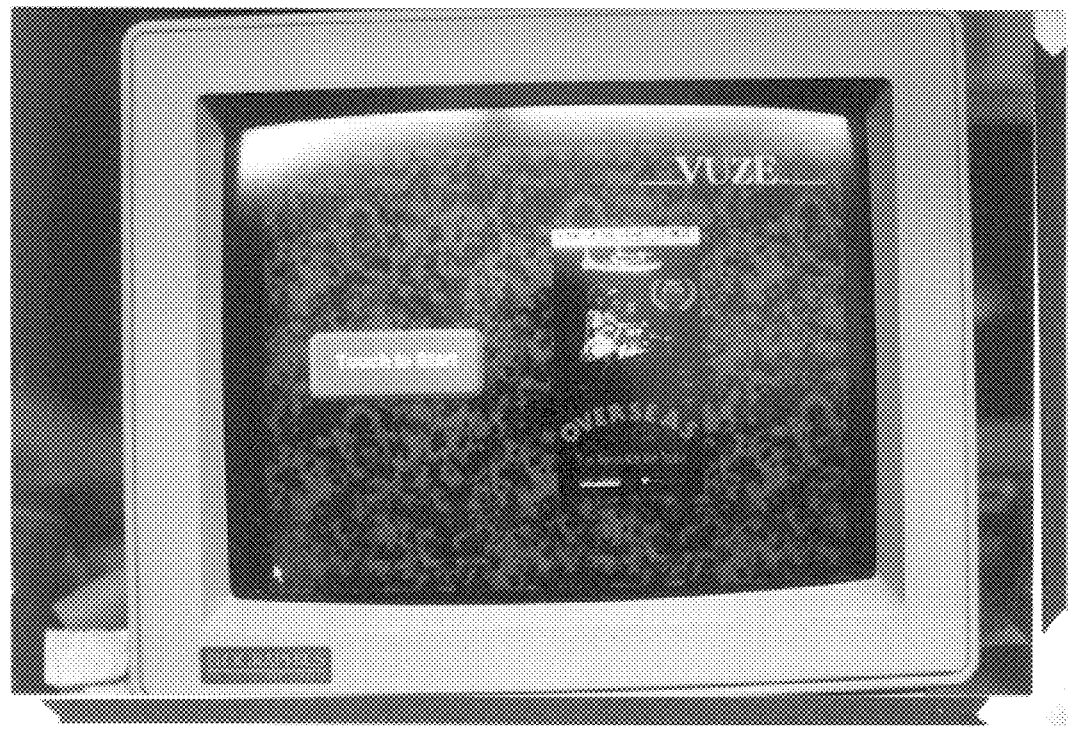

In one embodiment of the present invention, the initial screen of the system provides several buttons for users to touch, through which they may choose which of several languages the program's interface will display. This allows retailers (or subsequent customers in other venues) to tailor the language of buttons and screen instructions to suit the specific needs of their clientele. For example, each of the various "Touch-to-Start" buttons can be in the language of its choice. While the system is in the "Touch-to-Start" mode, awaiting someone to pick a language for the interface, graphics of video cover art randomly cycle in the right hand side of the screen. FIGS. 1 and 2.

Attract Loop

In one embodiment, a series of "Attract Loops" runs as a screen-saver on the system, being activated whenever the screen is not touched within a set period of time (typically 60 to 90 seconds). WIN_ATRC.PRE (MICROFICHE APPENDIX, I.BB.). The "Attract Loop" thus provides an animated sequence comprised of pre-designed graphics involving, for example, the product's trademarked logo, music and a rapidly-paced montage of short clips from many popular and classic films and videos. This part of the program is an entertaining way to entice customers to approach the kiosk, at which time they are invited to "Touch the screen" to start.

Main Menu

Figure 3:
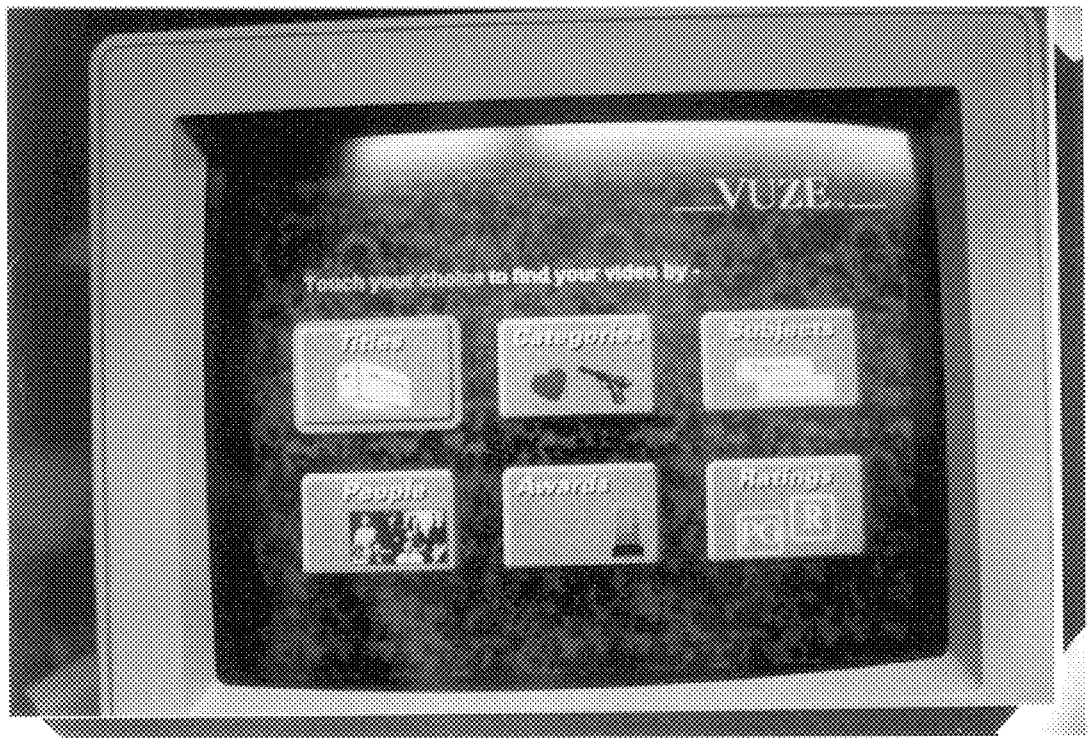
Figure 4:
Figure 5:
Figure 6:
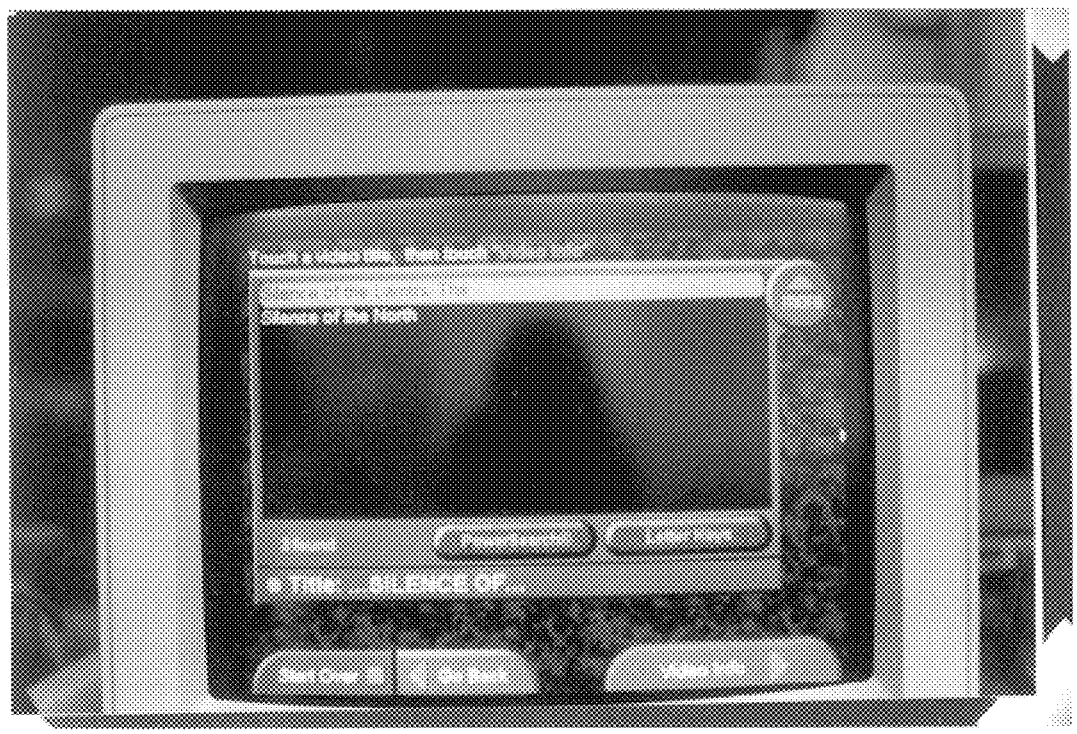
Figure 7:
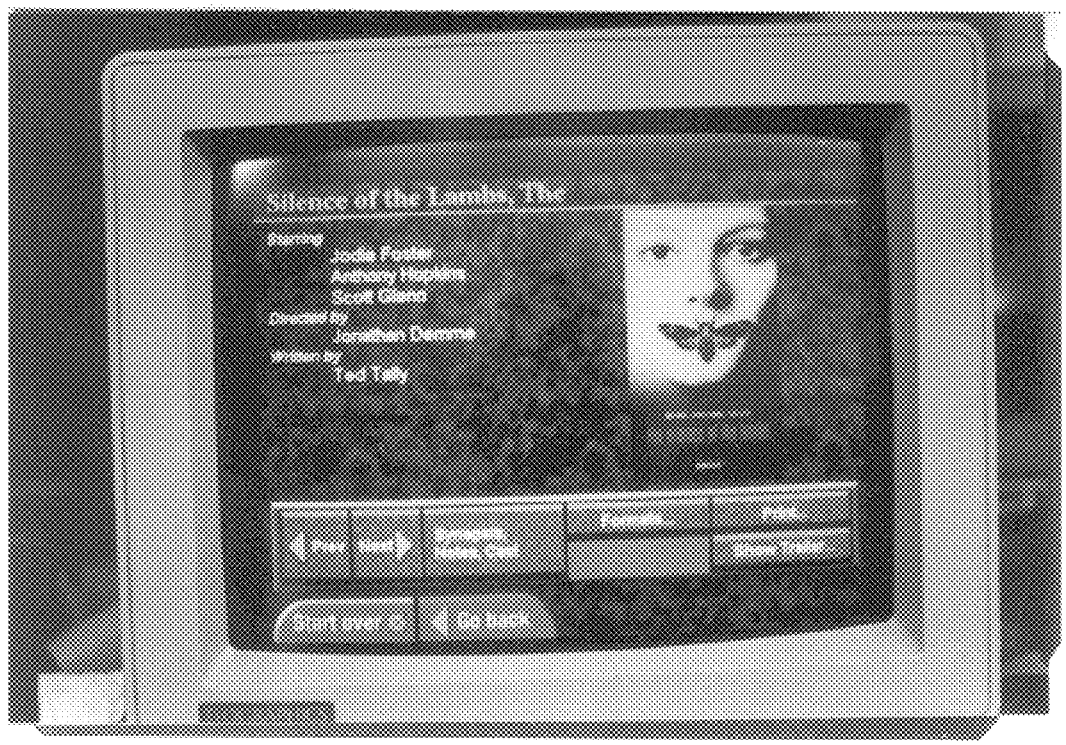
Figure 8:
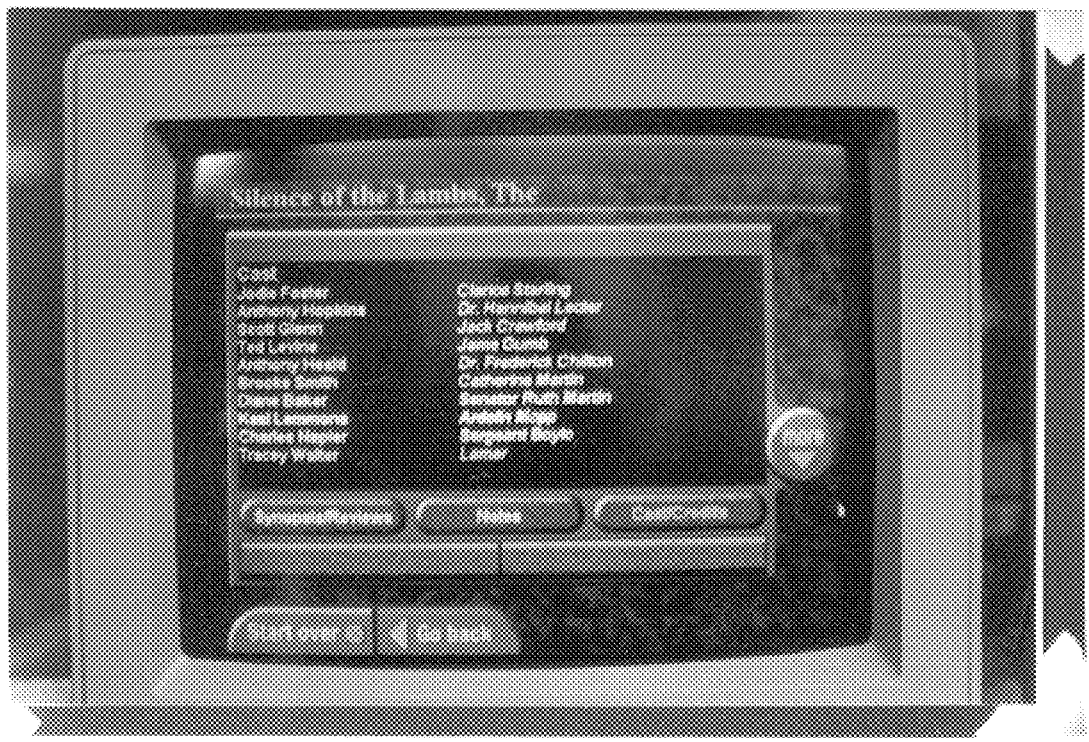
Figure 9:
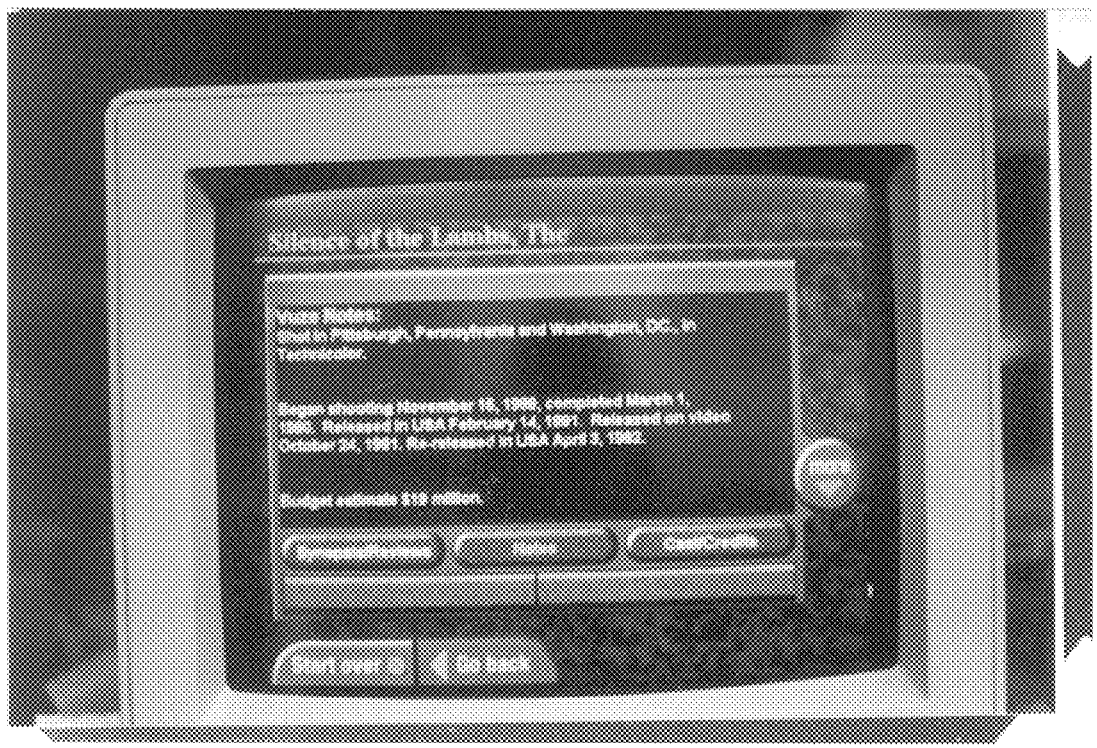
Figure 10:
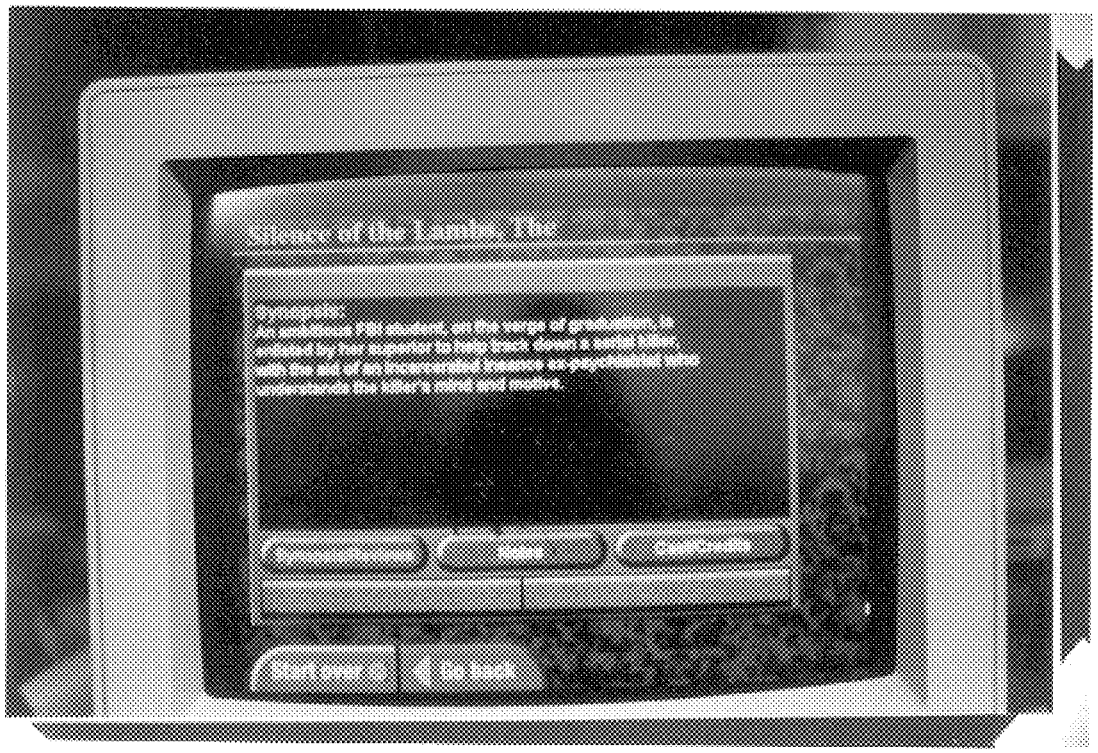
Figure 11:
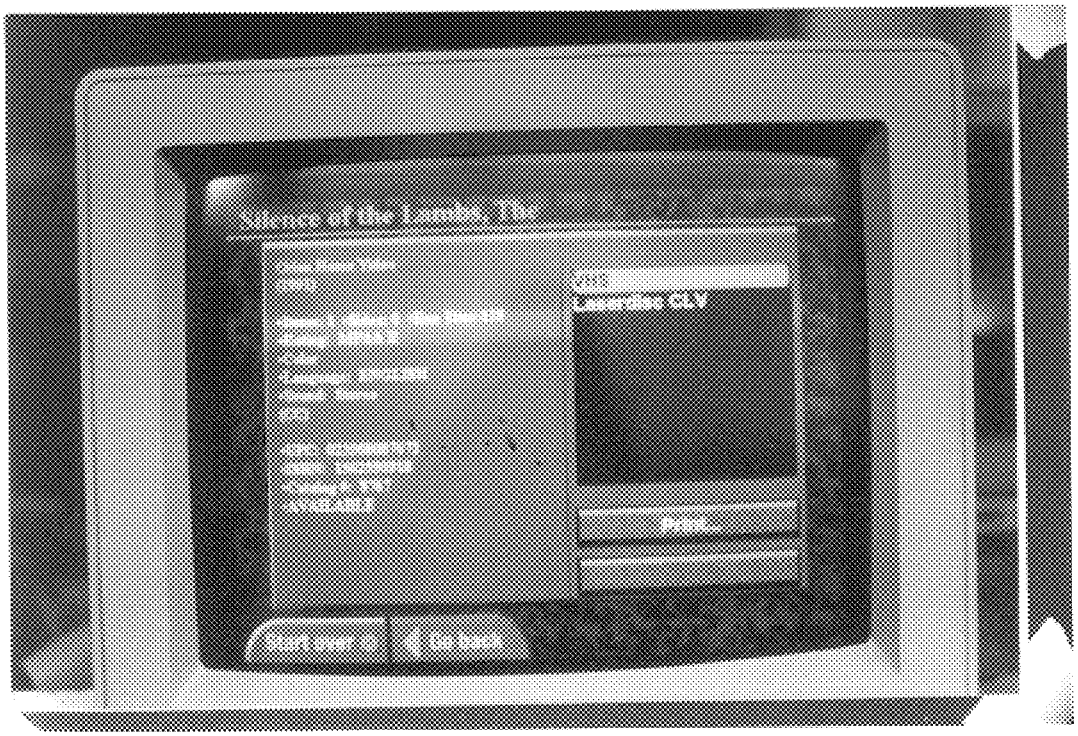
Figure 12:
Figure 13:
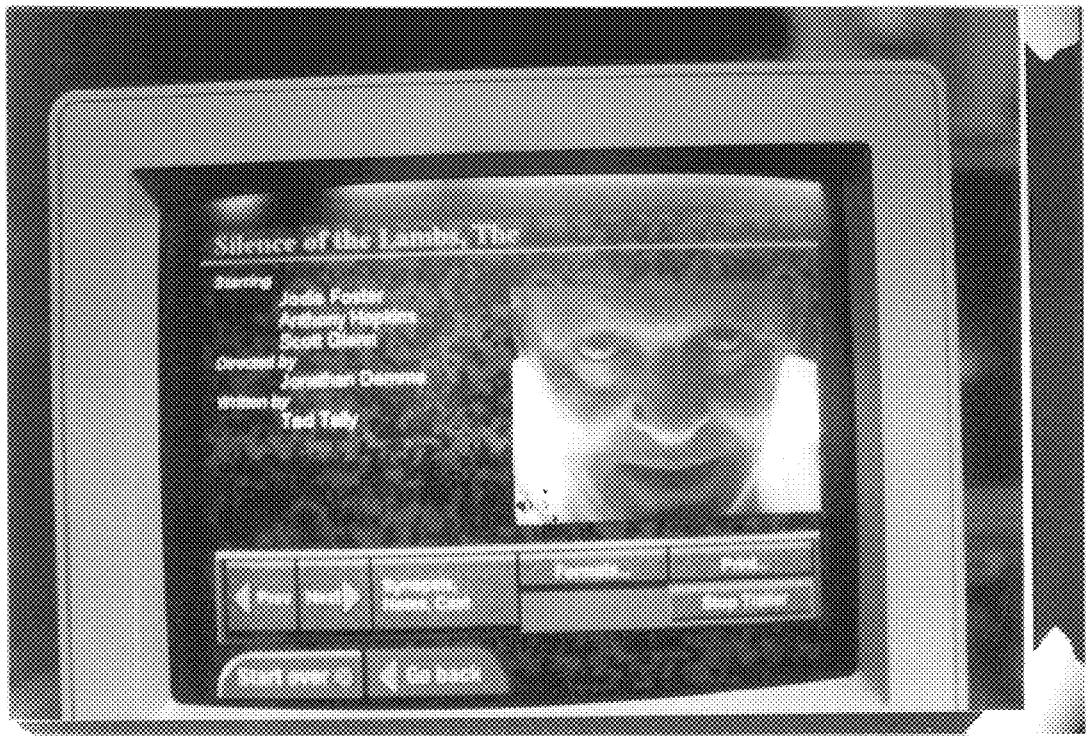
Figure 14:
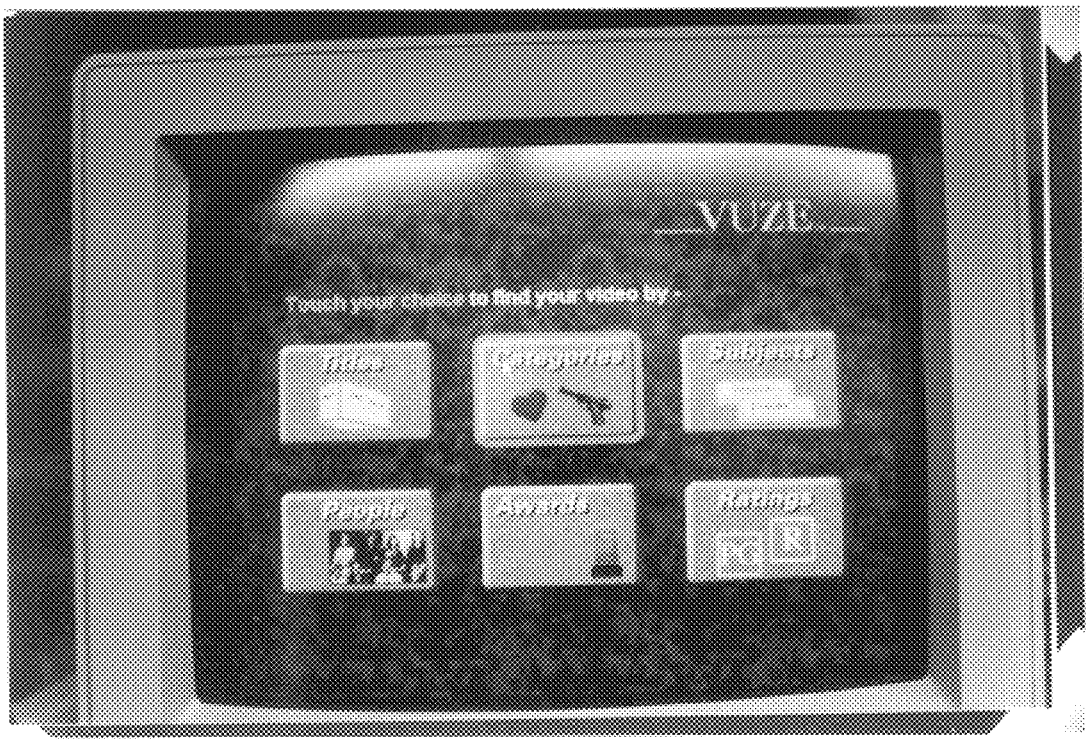

The system Main Menu allows users to perform lookups through any of six entry points in the system (FIG. 3). Entry into the system at these points provides the user with certain specific information.

Title(s)

The release title of any video in the database as well as theatrical release titles, working titles, foreign language translations, and any other aka(s) that may be germane. See FIGS. 3–13 and also 05SETUP.PRE (MICROFICHE APPENDIX, I.B.5.).

Name(s)

The name or aka(s) of any person or group of people receiving credit for a significant involvement in a film or video. FIGS. 33–41. The database tracks, in addition to directors and actors (which generally constitutes the sum of the current video products tracking capabilities), producers, writers, source writers, composers, designers and other notable contributors. The system also tracks name changes (for example, those of actress Ellen Burstyn) and pseudonyms (for example, directors who do not want their real name associated with a film) as well as different people having the same name (the system's internal data structure allows it to clearly differentiate the English actor-John Williams from the American actor-John Williams from the composer-John Williams and the guitarist-John Williams). See FIG. 37 and also 04SETUP.PRE and 05SETUP.PRE (MICROFICHE APPENDIX, I.B.4. and I.B.5.).

Categories/Genres

Figure 15:
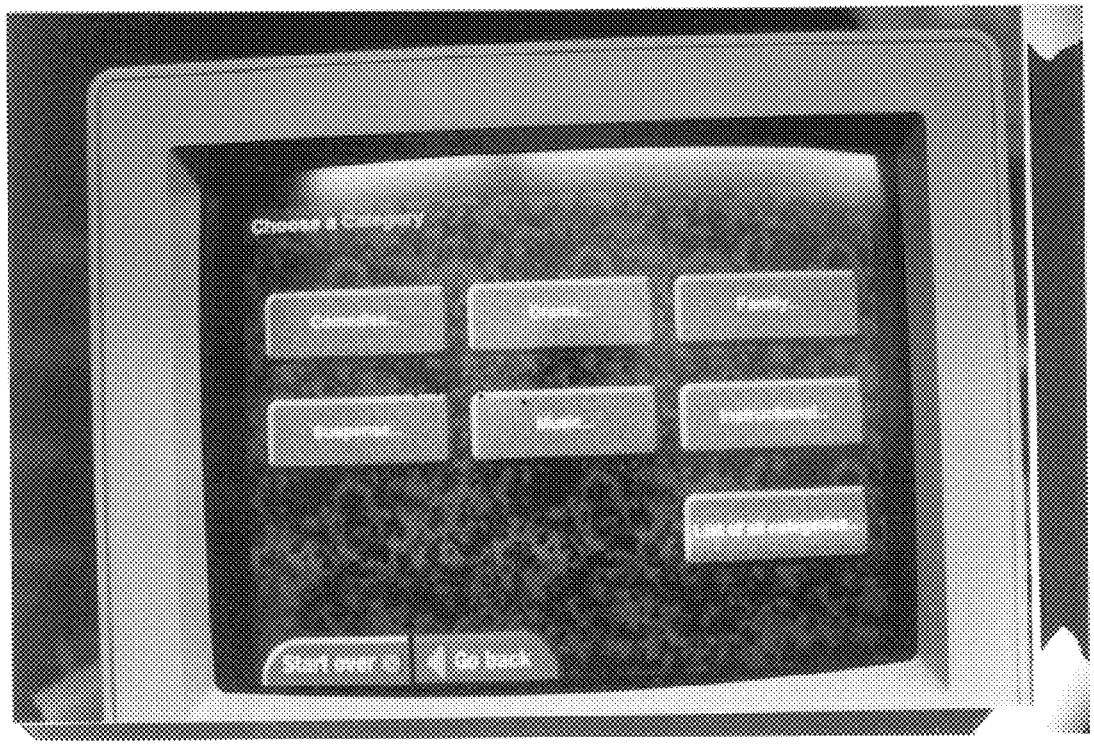
Figure 16:
Figure 17:
Figure 18:
Figure 19:
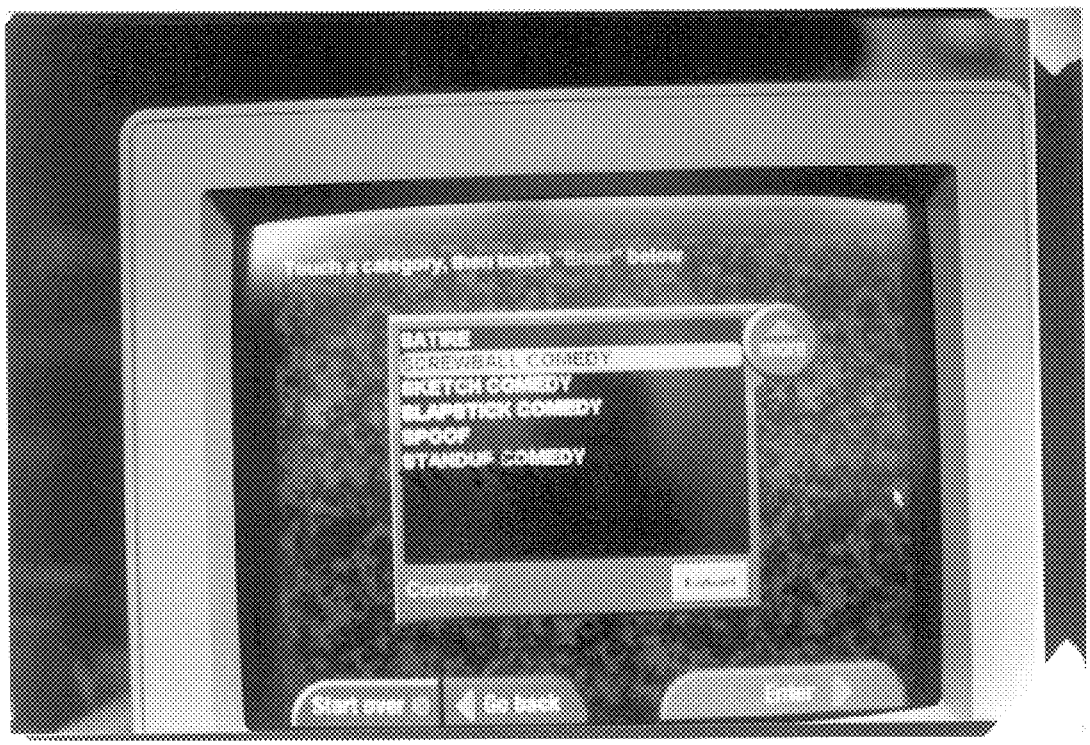
Figure 20:
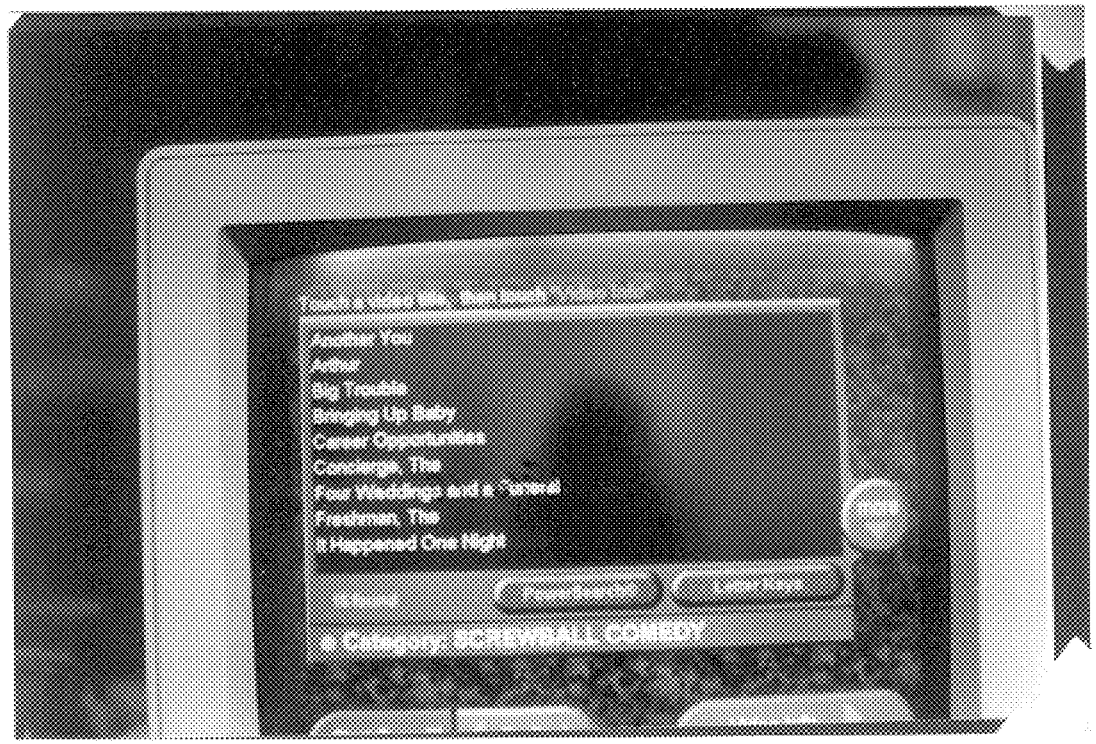
Figure 21:
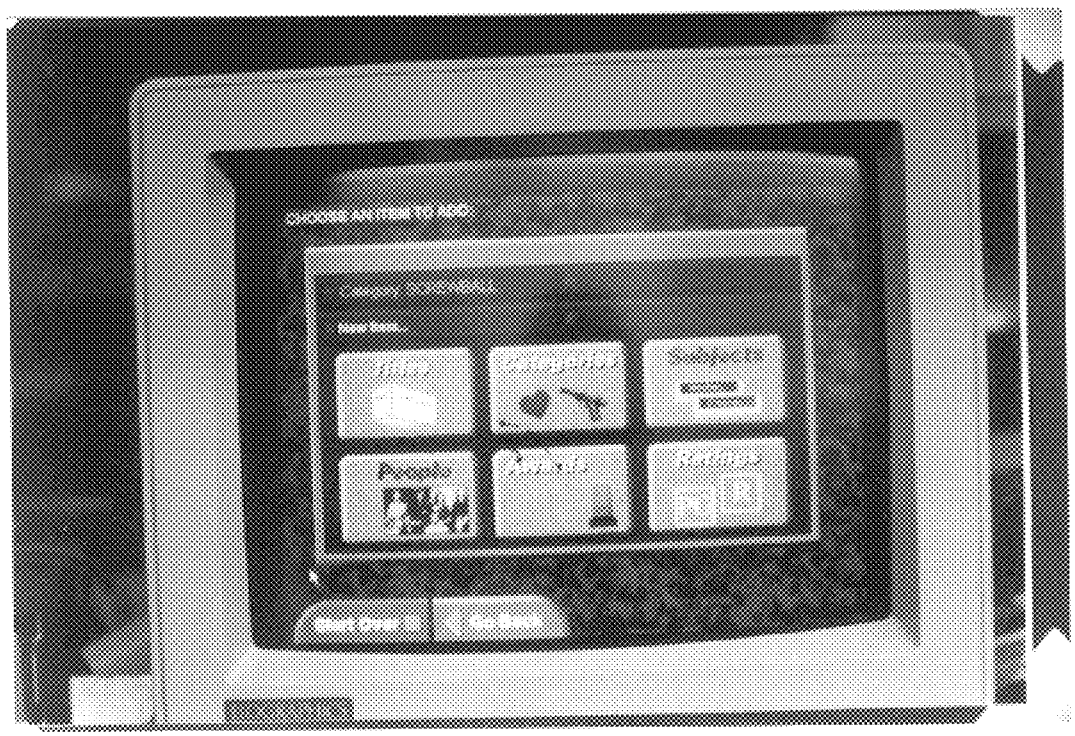
Figure 22:
Figure 23:
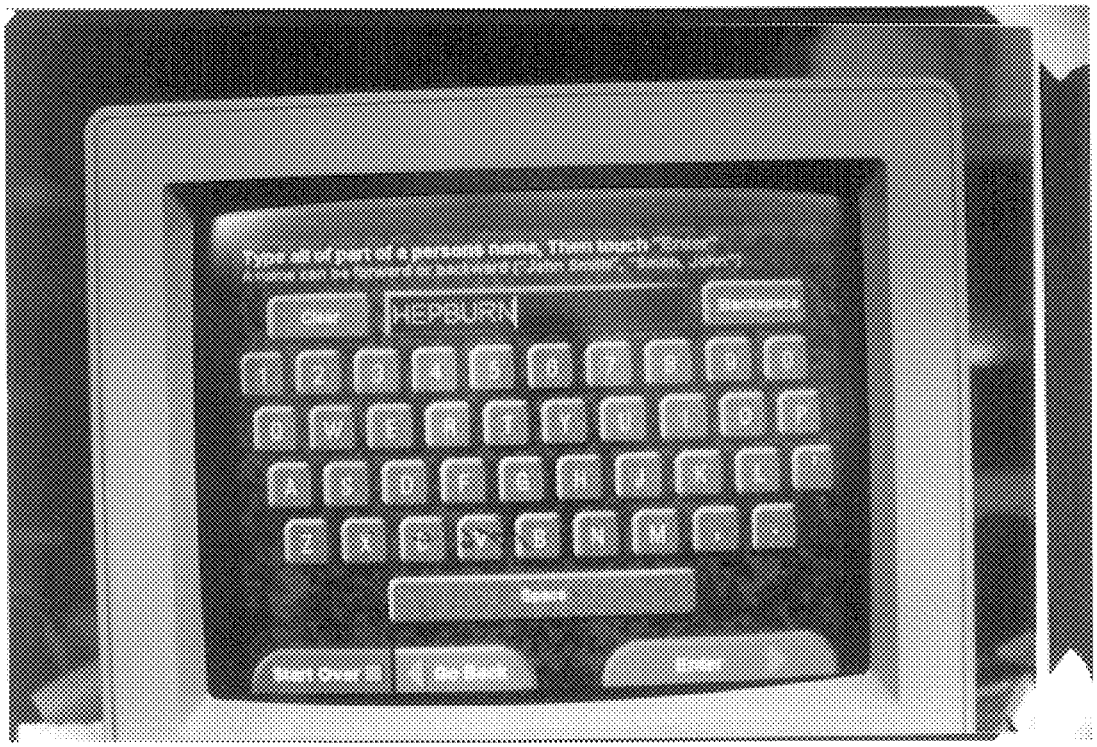
Figure 24:
Figure 25:
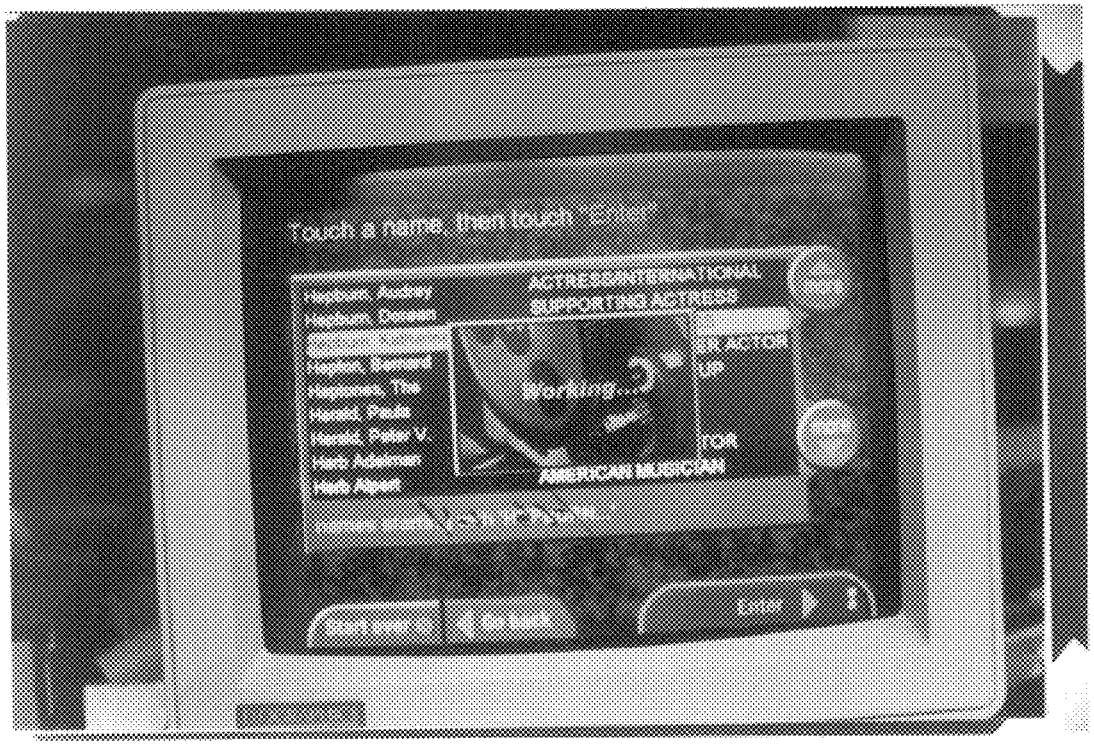
Figure 26:
Figure 27:
Figure 28:
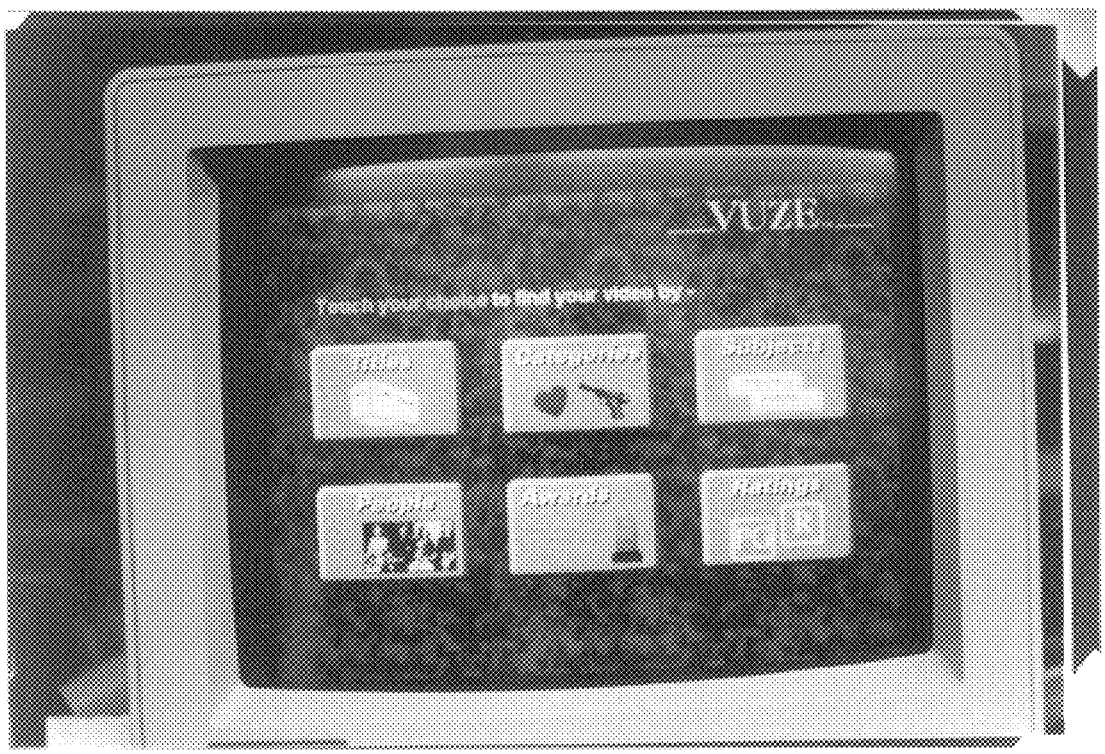
Figure 29:
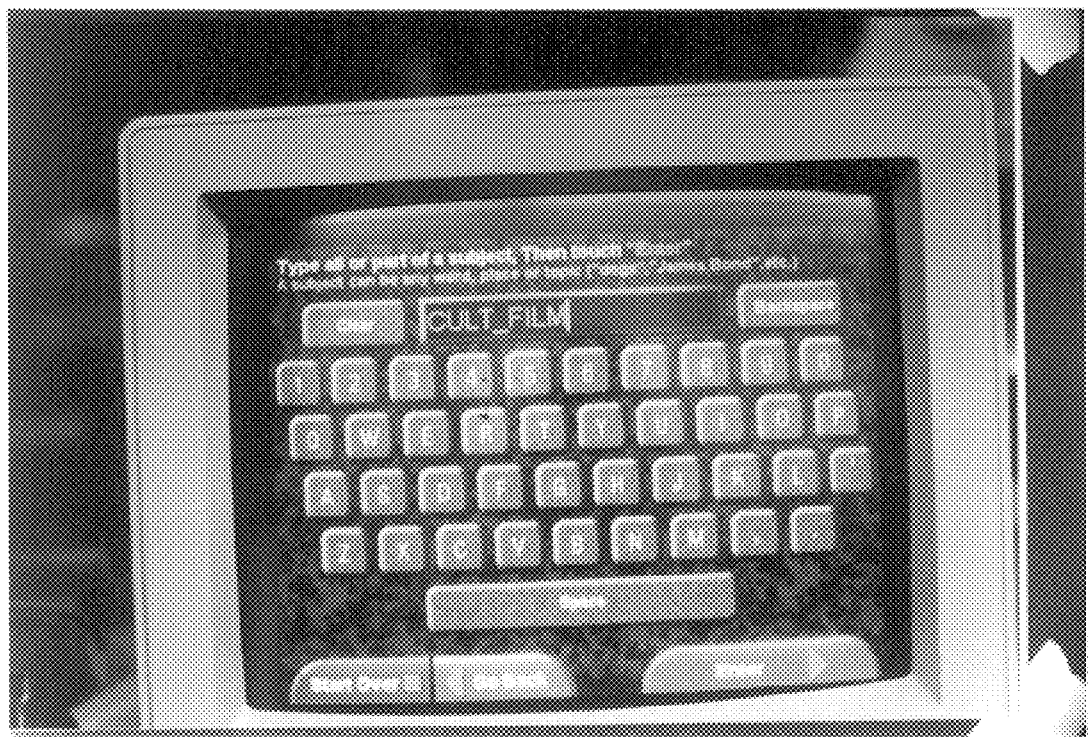
Figure 30:
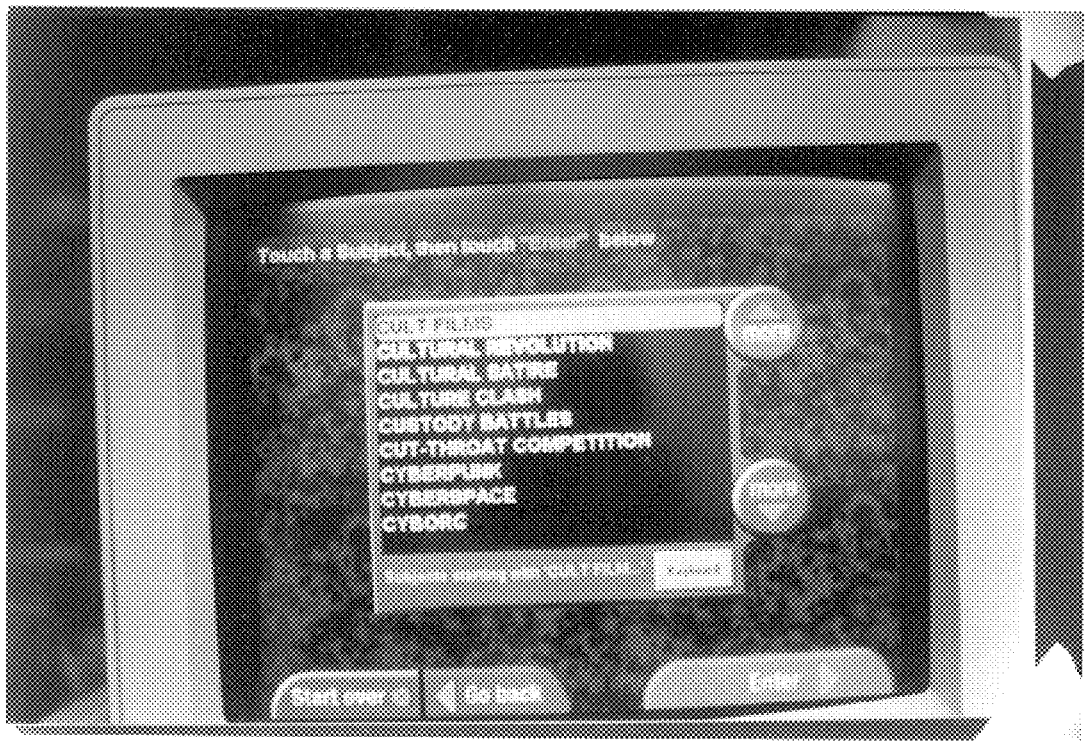
Figure 31:
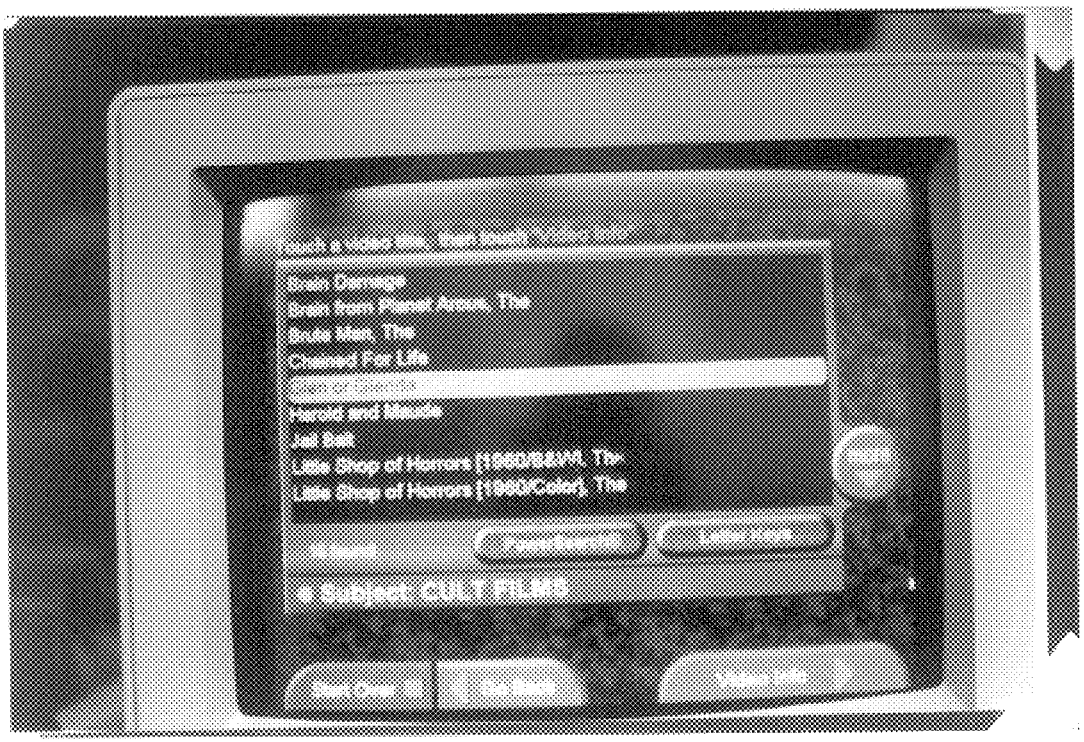
Figure 32:
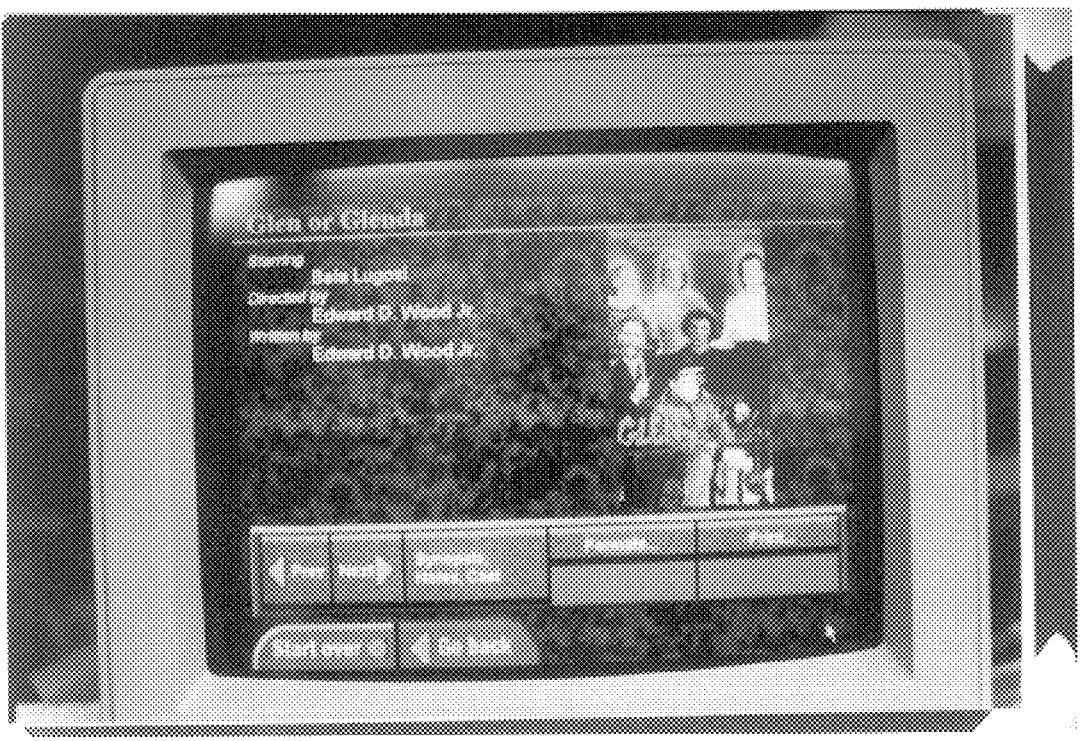
Figure 33:
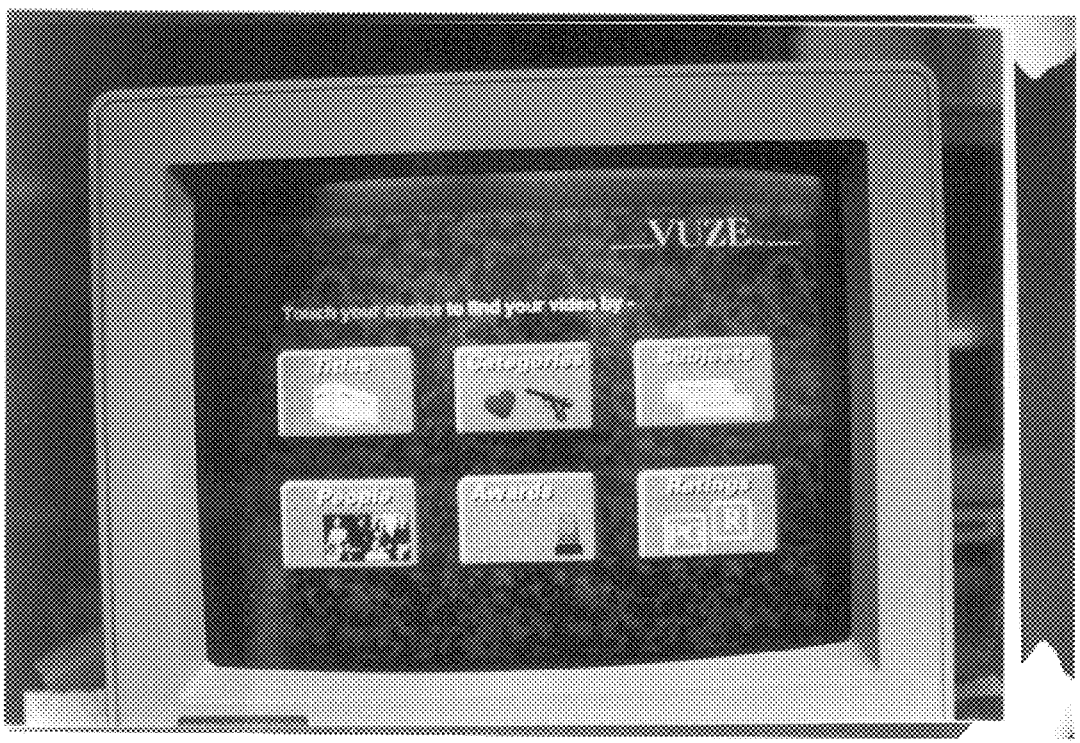
Figure 34:
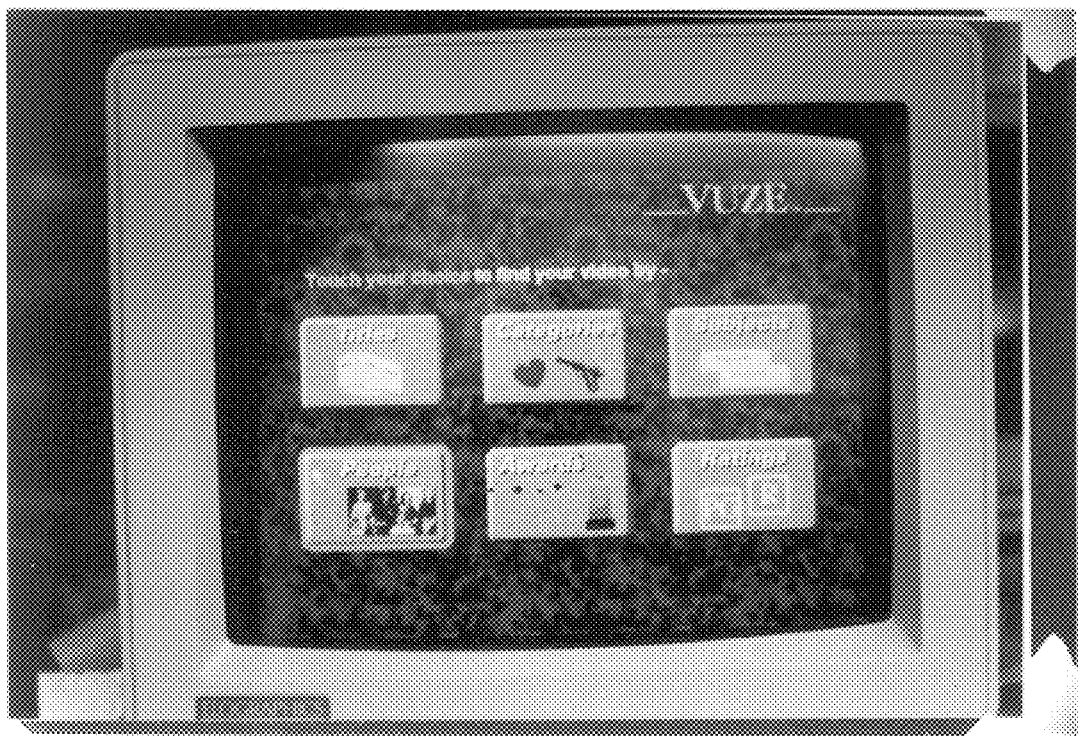
Figures 35, 36:
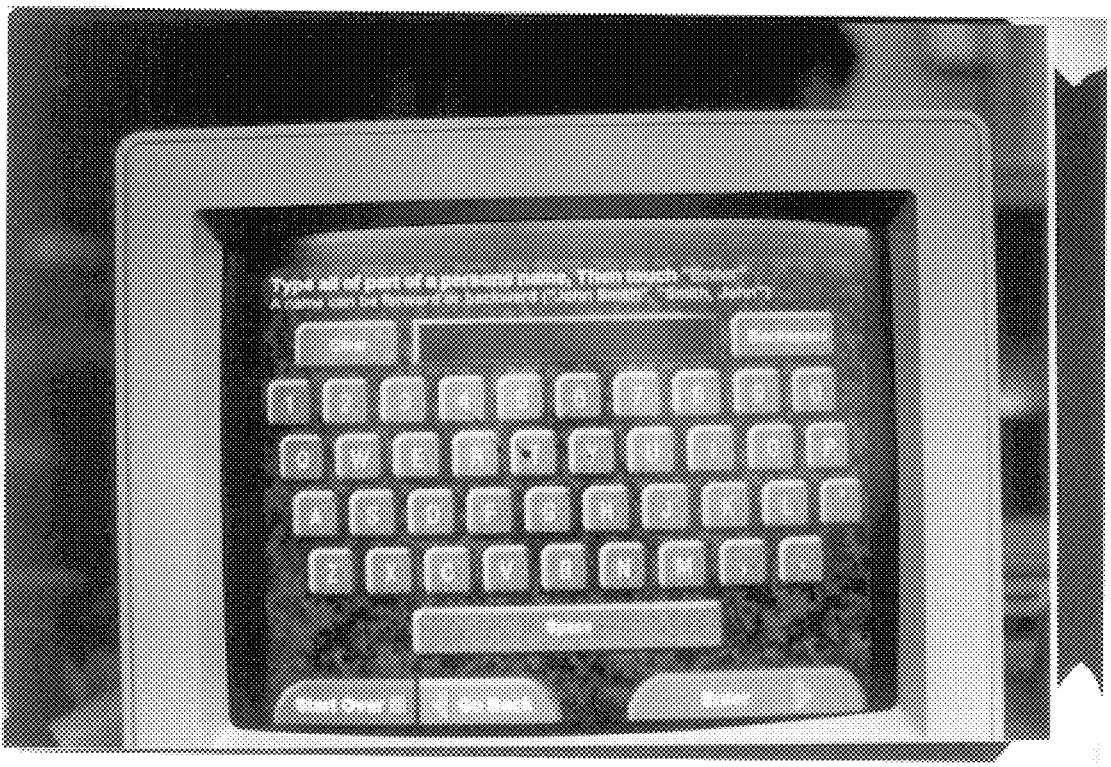
Figure 37:
Figure 38:
Figure 39:
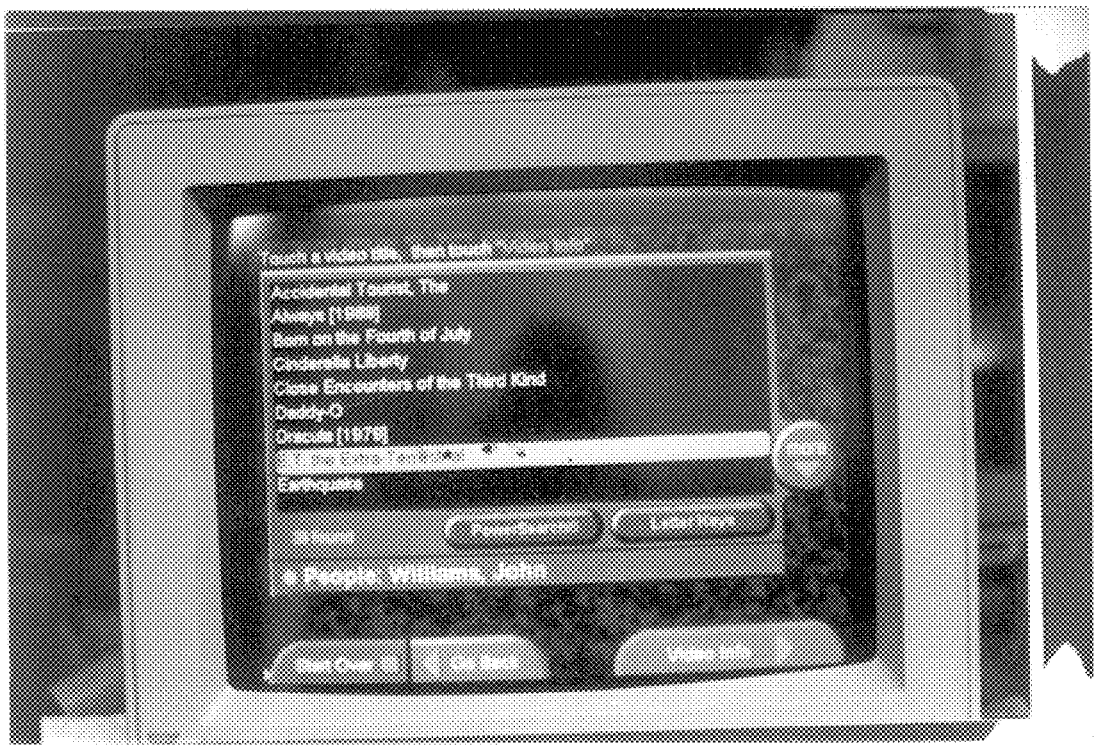
Figure 40:
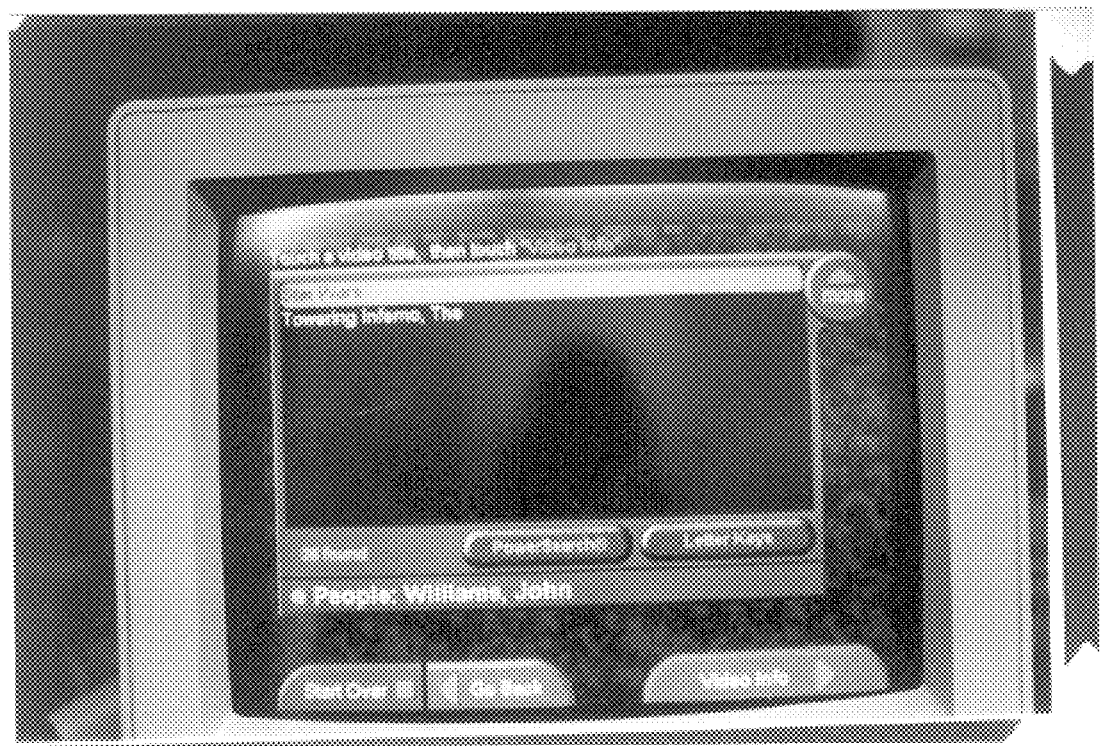
Figure 41:
Figure 42:
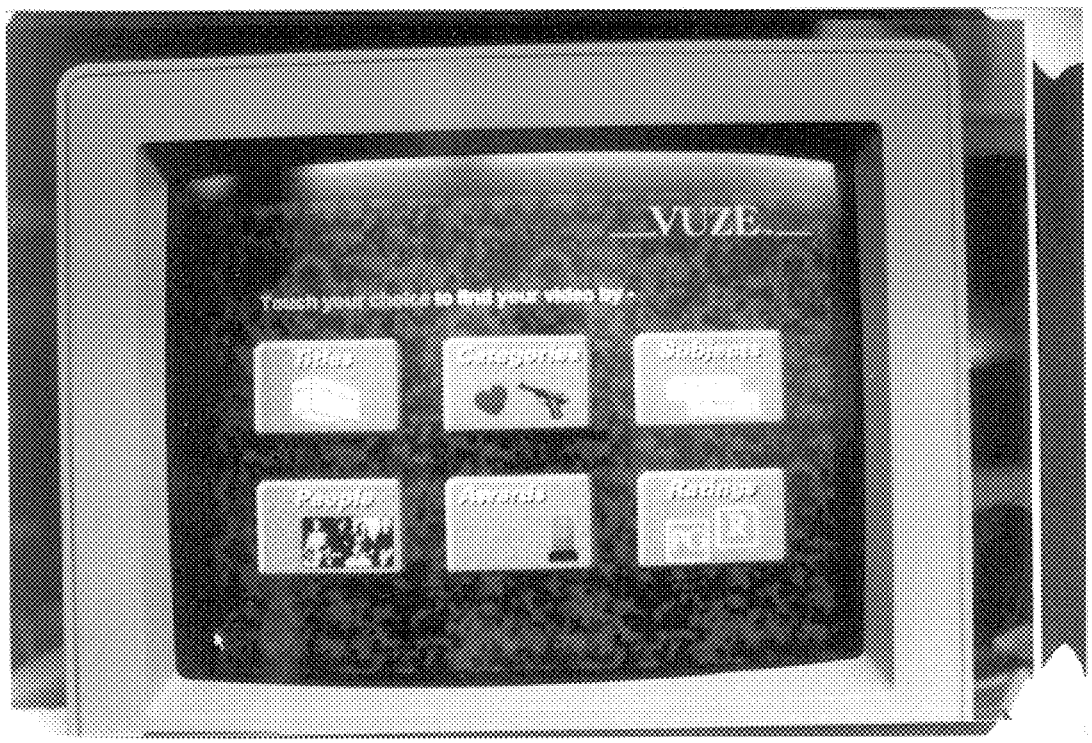
Figure 43:
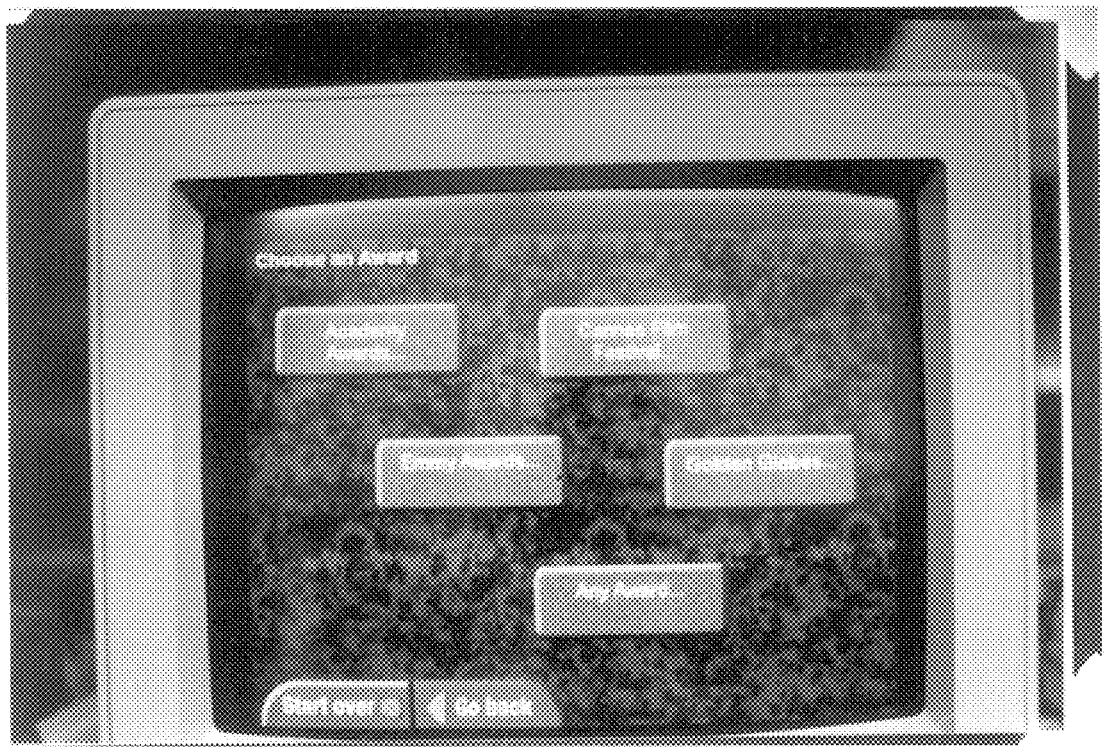
Figure 44:
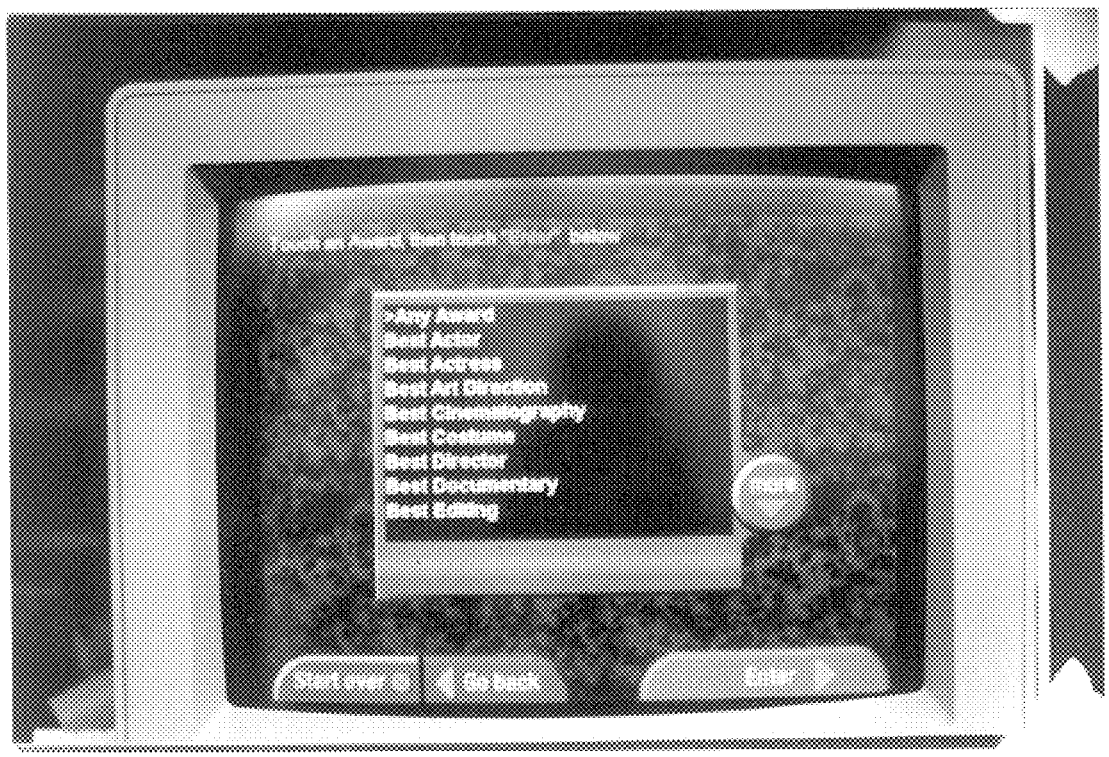
Figure 45:
Figure 46:
Figure 47:
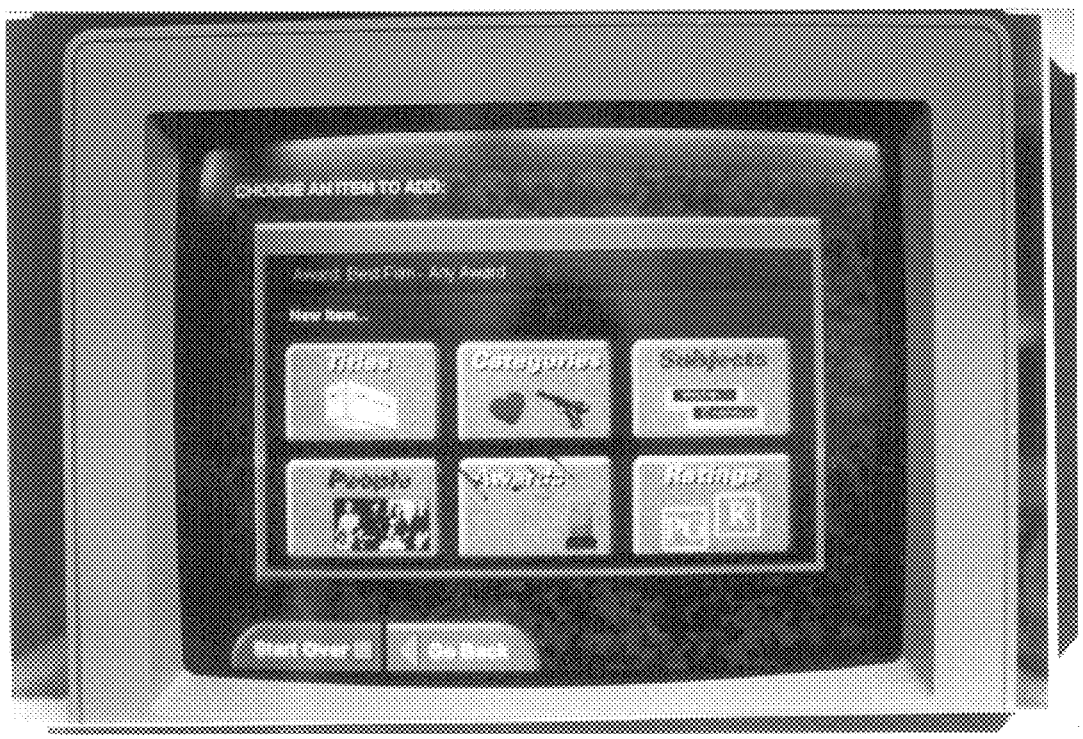
Figure 48:
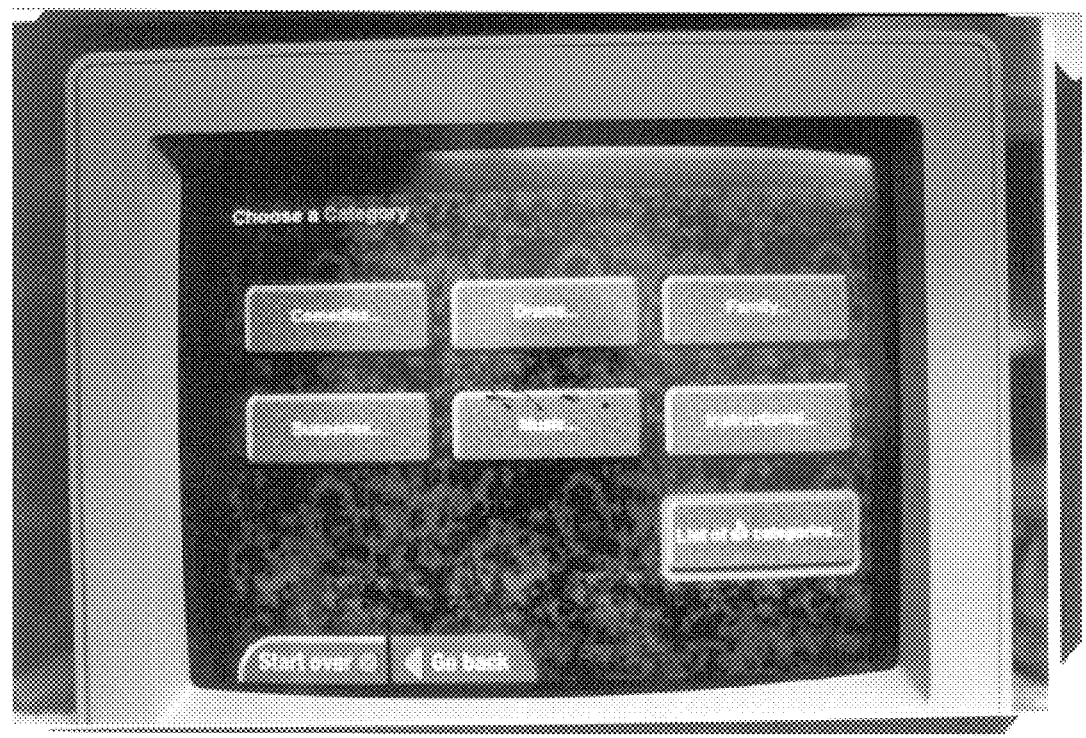
Figure 49:
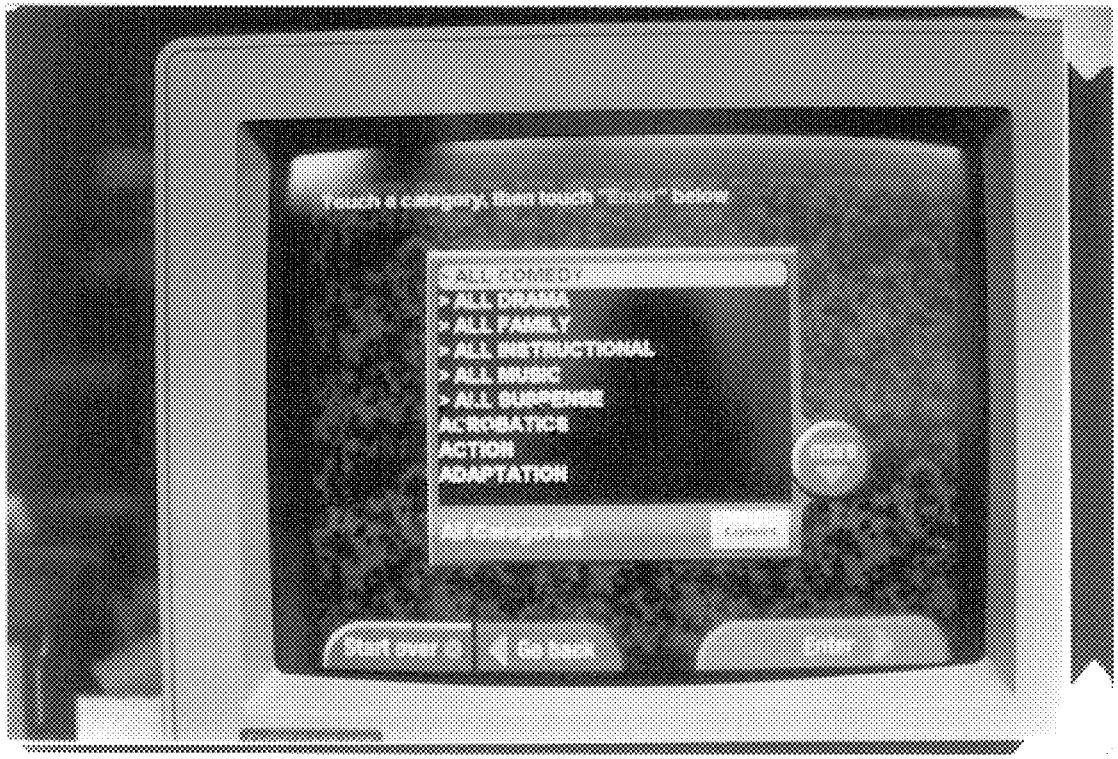
Figure 50:
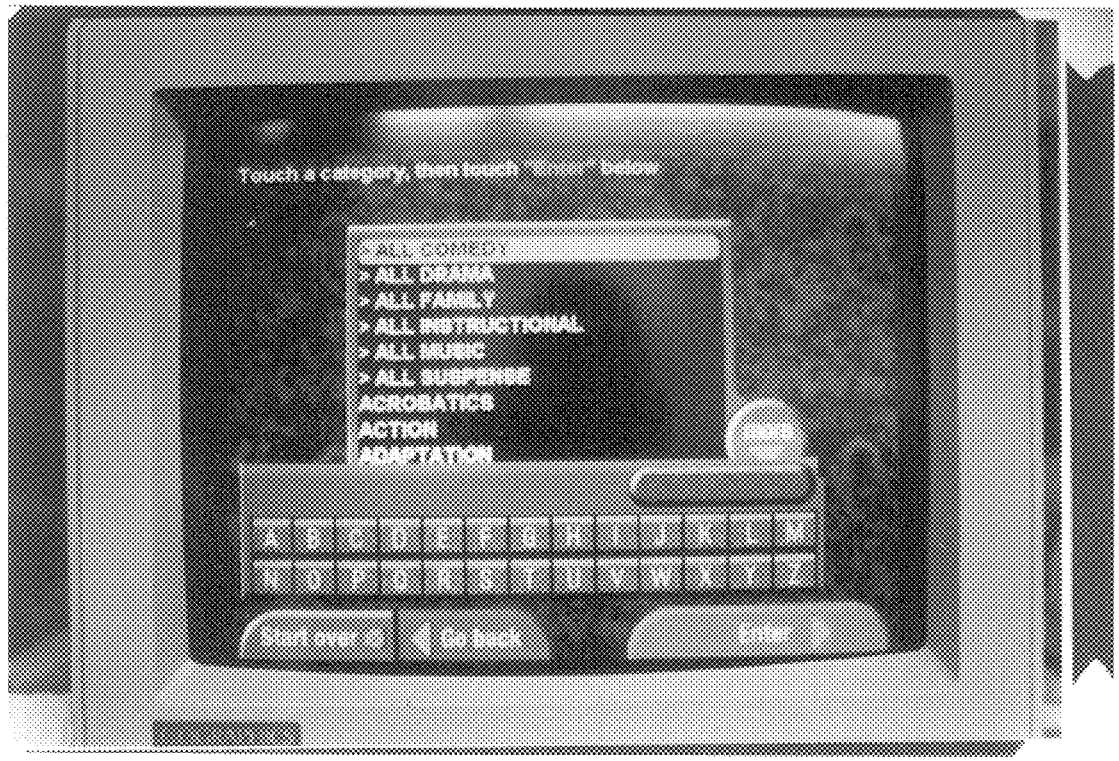
Figure 51:
Figure 52:
Figure 53:
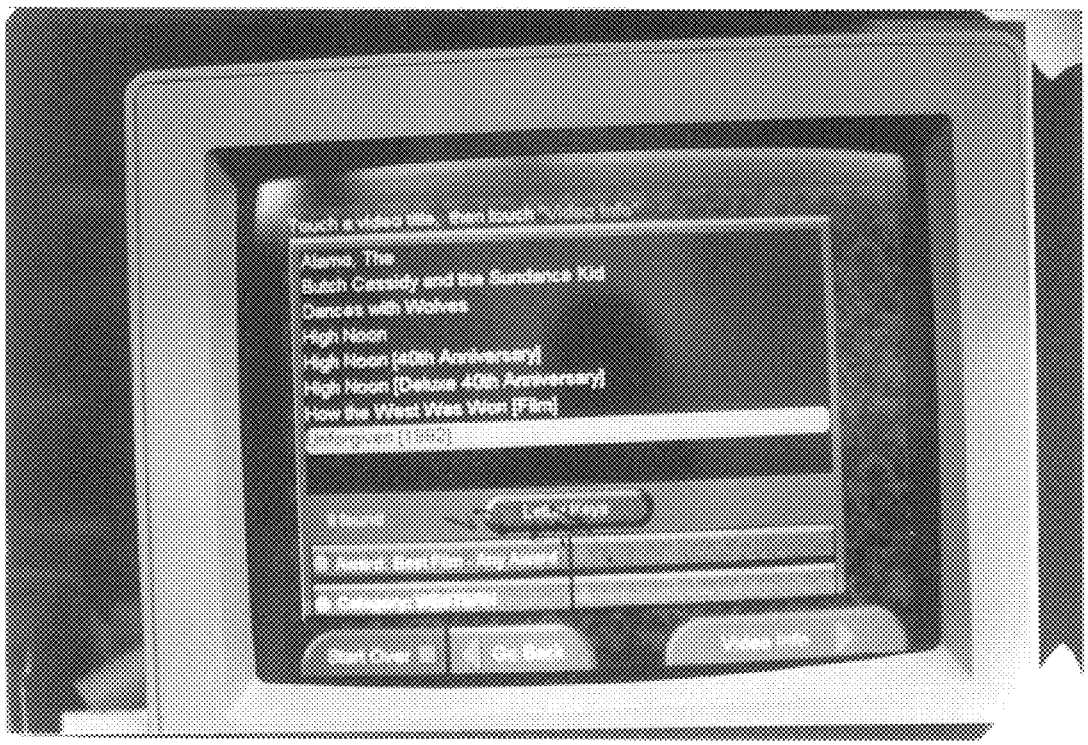
Figure 54:
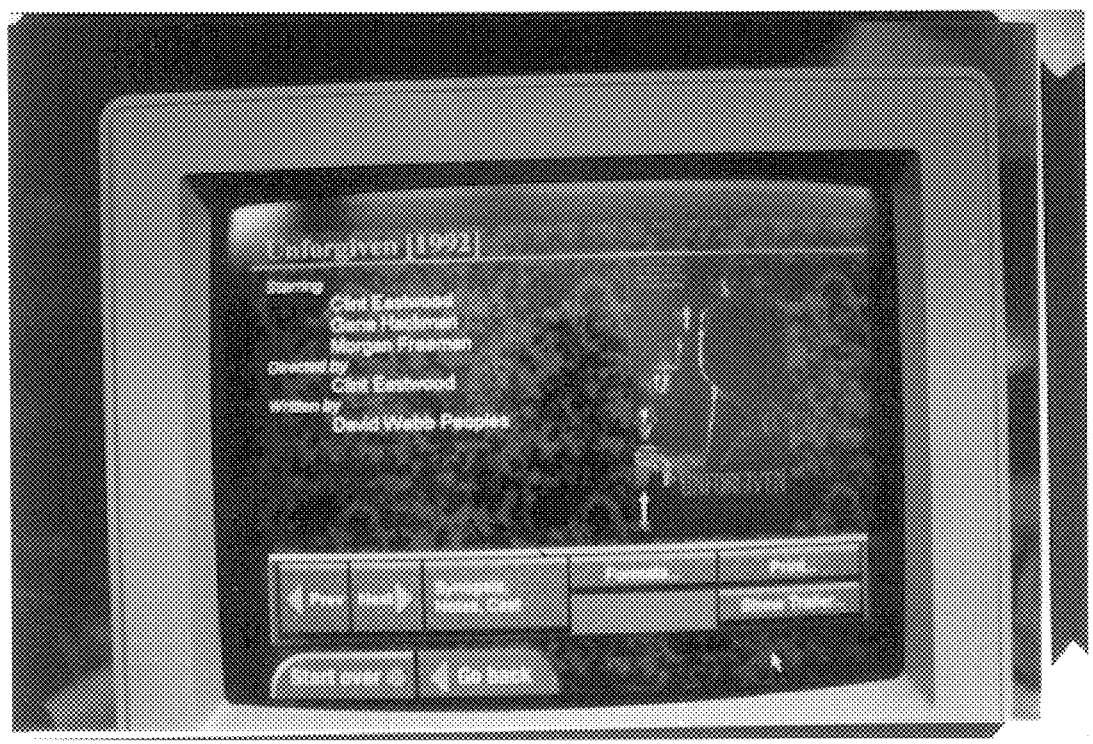
Figure 55:
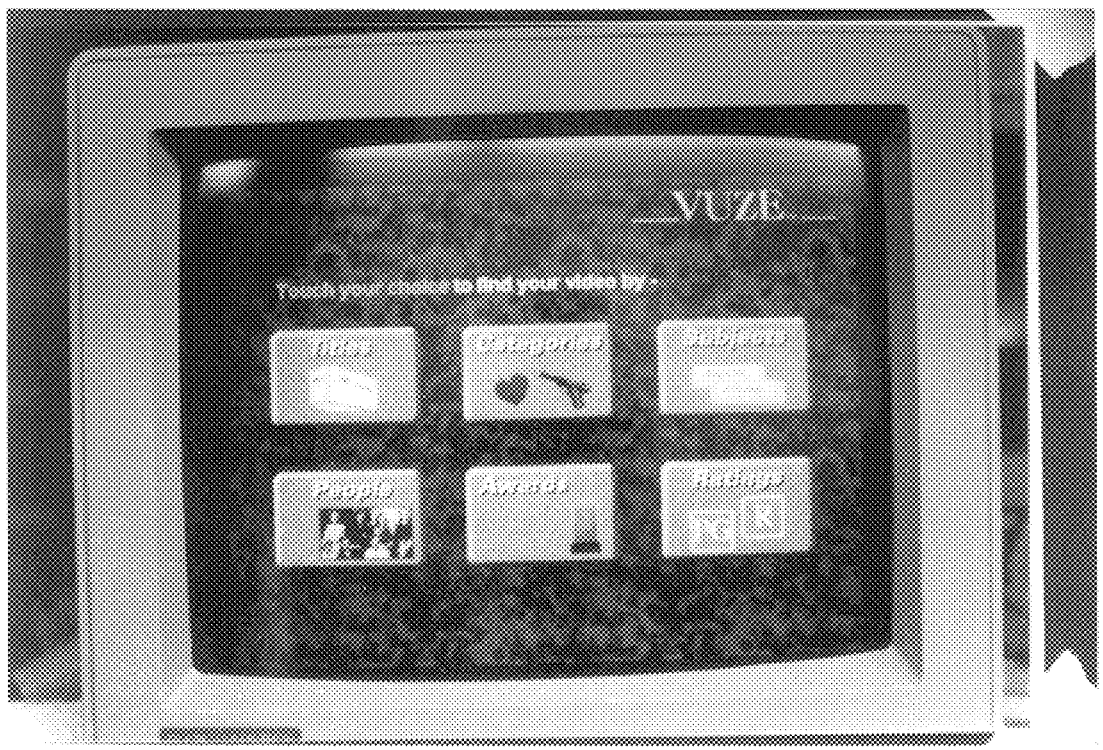
Figure 56:
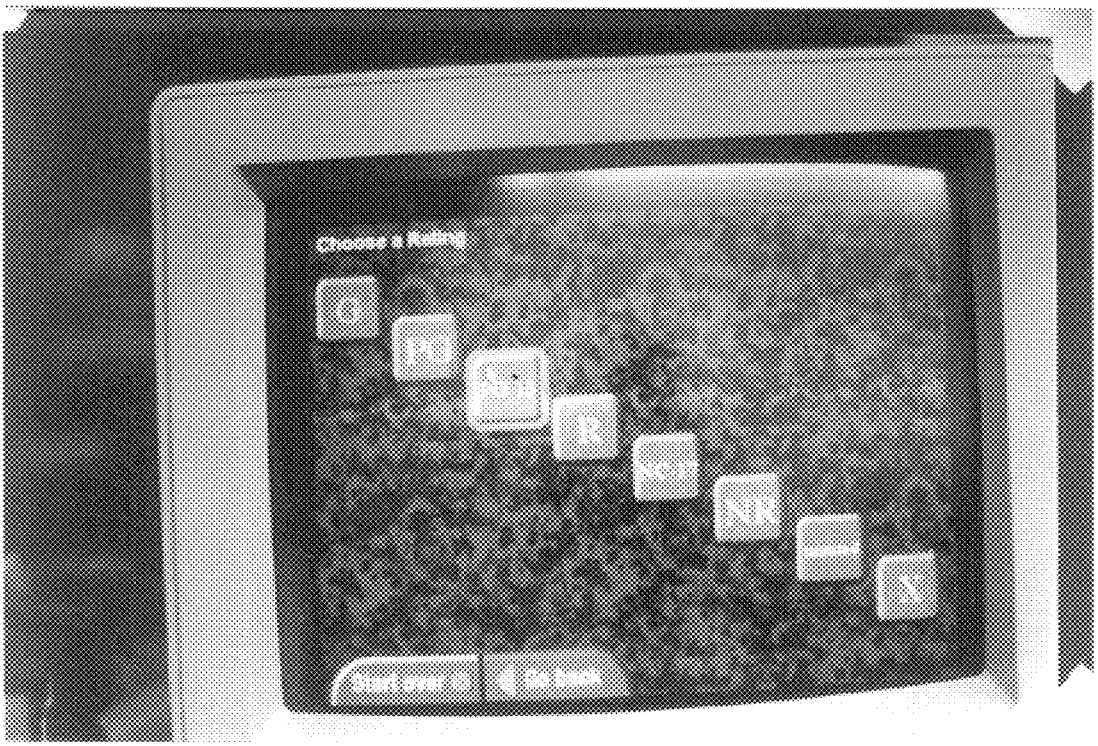
Figure 57:
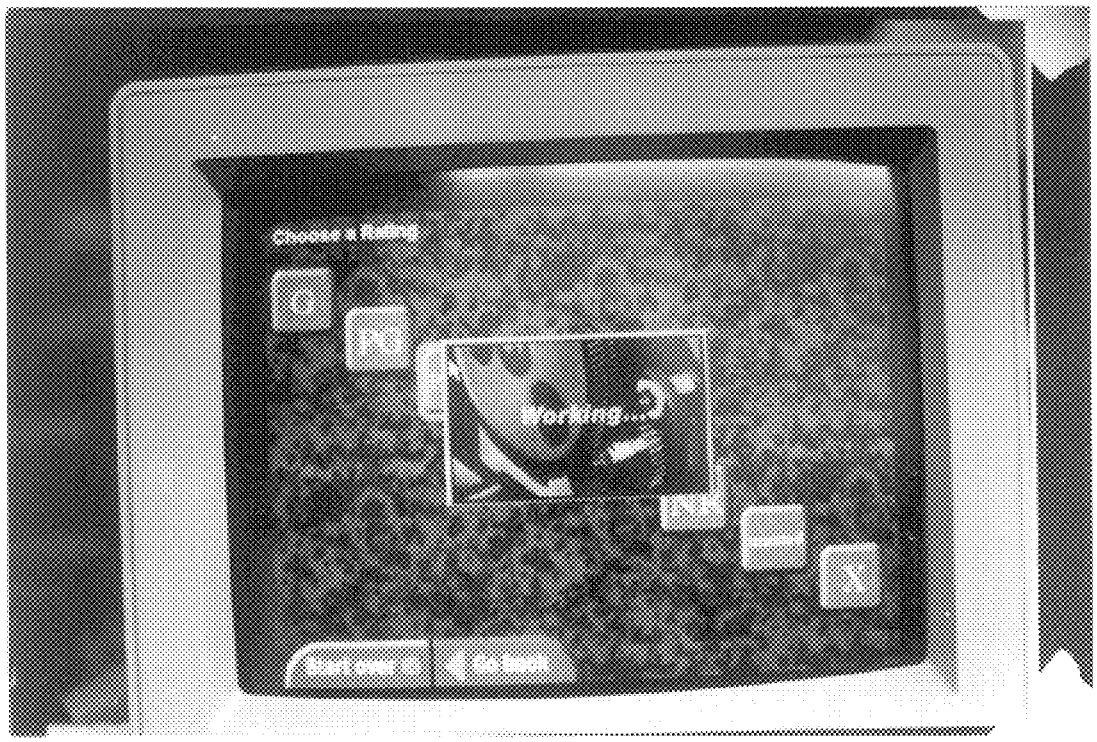
Figure 58:

The Category/Genre (the terms category and genre are used interchangeably) lookup provides users, who know the type of film or video they are looking for, to go directly to a complete master-list of all video categories. FIGS. 14–27. Novice users or users who may wish to be directed in their searches may consult the system's six "Meta-Categories," under which are subsumed almost all of the genres in the system's complete list. FIG. 15. Those who make use of the system's "Meta-Categories" will be led through subcategories on subsequent screens, which will present them with additional choices. FIG. 16. They may go further down these lists or go directly to a list of all videos for that category/genre. See also, 08SETUP.PRE, 09SETUP.PRE and 05SETUP.PRE (MICROFICHE APPENDIX, I.B.8., I.B.9 and I.B.5.).

Subjects/Topics/Keywords

Users of the system may search for information on films and videos by means of any of a wide range of keywords that are associated with the respective titles in the database. FIGS. 28–32. These keywords may range from the significant (names of historical events, geographic locations, themes, styles of cinema) to the arcane (topics such as Adrenoleukodystrophy, agoraphobia, commedia dell'arte, dead bodies in car trunks, transvestism) to the completely ridiculous (blind dates from Hell, celibate professors, dogs driving motor vehicles). See, 11SETUP.PRE and 05SETUP.PRE (MICROFICHE APPENDIX, I.B.11. and I.B.5.). Users may input a complete term or just the first few letters of any "keyword" term to get a result list that shows keywords that begin with that string as well as those that have that string of characters embedded within.

Awards

Through the Awards entry-point, users may make a search based on any of a number of award organizations (Academy Awards, Cannes Film Festival Awards, etc.) and the particular categories of the awards the organizations present (Best Supporting Actor, Palm d'Or, etc.). See FIGS. 42–54 and also 18SETUP.PRE, 19SETUP.PRE and 05SETUP.PRE (MICROFICHE APPENDIX, I.B.18., I.B.19 and I.B.5.).

Ratings

Through the Ratings entry-point in the system, users may make a search based on any of the ratings designations provided by the Classification and Ratings Administration of the Motion Picture Association of America (G, PG, PG-13, R, NC-17) as well as videos that have no ratings (Not Rated—meaning those released prior to the advent of the CARA system, and Unrated—those never submitted for ratings) as well as those with self-imposed ratings. FIGS. 55–59. Since the MPAA's ratings are for films in their original, theatrical release, the system can also track multiple releases of the same product in differing versions (for example, a video released as [Unrated] due to the addition of scenes not in the original release). This is a particularly useful tool for parents trying to make informed decisions about what their children may rent, buy or view. See also 10SETUP.PRE and 05SETUP.PRE (MICROFICHE APPENDIX, I.B.10. and I.B.5.).

PowerSearch Capability

On the other hand, the system's unique combination of extensive data, efficient storage and powerful, relational database technology allows it to provide users who are knowledgeable about the system (frequent users and store personnel) to make use of the "PowerSearch" capability, which permits them to combine up to four types of searches in any one lookup. The system does not pre-determine or limit what users may lookup in combination (although there can be no guarantee that all of their combination searches will provide the result for which they are looking). Thus, they may combine the names of four people to find those videos (if any exist) in which those people were involved (for example, Bert Parks and Bob Dylan to find the film in which the former sings a song by the latter), or two people and a category (Cary Grant, Katharine Hepburn and screwball comedy to find "Bringing Up Baby", FIGS. 20–27) or a keyword and a rating (for example, dinosaurs and PG). And if a combination search by a user produces no result, instead of just generation a "No Matches Found," or similar message, the system returns the user to the result of the prior successful search.

In the embodiment just described, the number of items that can be combined is limited to four so that the navigation and screen design not get too cumbersome; however, there is no virtual limit to the number of items that the system might be able to allow a user to combine. For example, another embodiment of the present invention may have a search facility that expands the number of combineable items to six or eight, or even more. Moreover, the system does not limit users from performing a lookup that involves several searches using the same entry-point. That is, users may search for four names in combination, four genres, four keywords, four awards and any combinations thereof. (Searches of more than one title or more than one rating—that is, searches that "and" these terms—will probably not be too useful, however.)

Although preferred specific embodiments of the present invention have been described above in detail, it is desired to emphasize that this has been for the purpose of illustrating and describing the invention, and should not be considered as necessarily limitative of the invention, it being understood that many modifications can be made by those skilled in the art while still practicing the invention claimed herein.

MICROFICHE APPENDIX TABLE OF CONTENTS

I. System Database Navigation and Preview
A. The Main program "event loop" —VUZE.PRE.
B. The different screens.
  1. 01SETUP.PRE
  2. 02SETUP.PRE
  3. 03SETUP.PRE
  4. 04SETUP.PRE 5. 05SETUP.PRE (this is the main screen for multiple criteria searches)
6. 06SETUP.PRE
7. 07SETUP.PRE
8. 08SETUP.PRE
9. 09SETUP.PRE
10. 10SETUP.PRE
11. 11SETUP.PRE
13. 13SETUP.PRE
14. 14SETUP.PRE
17. 17SETUP.PRE
18. 18SETUP.PRE
19. 19SETUP.PRE
21. 21SETUP.PRE C. Programs for replacing FoxPro's Browse Function.
1. PLST_PNT.PRE
2. PLST_HL.PRE
3. GET_PAGE.PRE
4. PAGE_BTN.PRE
5. PAGE.PRE
6. DISP_LNE.PRE D. Programs for replacing FoxPro's Number Storing Function.
1. BIN2DEC.PRE
2. DEC2BIN.PRE E. The "Procedure Stack" program—PUSH_STK.PRE.

F. Programs for replacing FoxPro's "Edit Region" Function.
1. SHW_NOTE.PRE
2. SHW_SYN.PRE
3. LOAD_NTE.PRE G. Program to Format, Place and Display a line of text Replaces FoxPro's "@ SAY . . ." function—SHW_STR.PRE.

H. Page up/Page down Functions.
1. 05PGDWN.PRE
2. 05PGUP.PRE
3. 04PGDWN.PRE
4. 09PGDWN.PRE
5. 09PGUP.PRE
6. 11PGUP.PRE
7. 11PGDWN.PRE
8. 13PGDWN.PRE
9. 13PGUP.PRE
10. 19PGDWN.PRE
11. 19PGUP.PRE
12. 04PGUP.PRE I. Cleanup code.
1. 05CLEAN.PRE
2. 06CLEAN.PRE
3. CLEAN.PRE J. Jumping from one video to another.
1. 06JUMP.PRE
2. 06NEXT.PRE
3. 06PREV.PRE K. Play a Video Clip—LZ_PLAY.PRE.

L. Changing Search criteria.
1. CHG_SEL.PRE
2. DEL_SEL.PRE

M. Programs to retrieve data from a database.

1. GET_CFG.PRE
2. GET_COMP.PRE
3. GET_LANG.PRE
4. GET_STR.PRE
5. GET_TBL.PRE

N. Program to accept input from on-screen Keyboard—KB_INP.PRE.

O. Program to load the configuration file—LOAD_CFG.PRE.

P. Program to select another search criterion—NARROW.PRE.

Q. Programs to alert the user of an invalid selection.
1. NOSELECT.PRE
2. SORRY.PRE R. Programs to perform an alphabetic search into a list.
1. SMALL_KB.PRE
2. BS.PRE S. Program to Print a Receipt—VPRINT.PRE.

T. Program to alert users their time is up—TIME_OUT.PRE.

U. Program to Track all user input—TRACK_IT.PRE.

V. Program to setup Vuze.
1. VSETUP.PRE
2. VUZEOPEN.PRE

W. Program to ring a bell—V_BELL.PRE.

X. Program to dim a navigation button—DIM3BTN.PRE.

Y. Program to display Video Format information—SHW_FMT.PRE.

Z. Program to display Video Notes—SHOW_NTE.PRE.

AA. Program to highlight a button—HL_BUTN.PRE.

BB WIN_ATRC.PRE Program.

II. SYSTEM SEARCH, COMPRESSION AND DECOMPRESSION PROGRAMS

A. For the Fast Bitmap Searches.
1. PACK.C
2. WBIT.C
3. UNPACK.C

B. For displaying Iterated Systems Fractal Graphics—FOXFRACT.C.

C. For displaying MPEG Full Motion Video Files—FOXMPE.C

III. SYSTEM INPUT PROGRAMS

A. Main Program.
1. VIDEO.H
2. VIDEO.PRE
3. GLOBAL.H

B. Programs for Maintaining Awards.
1. AWARDORG.PRE
2. VAWARD.DEF
3. VAWARD.PRE
4. VAWARDL.PRE C. Program to Maintain the Databases—DBFMAINT.PRE.

D. Programs to Maintain Tables of information.
1. EDIT_TBL.PRE
2. EDT_SKAT.PRE
3. GET_SKAT.PRE
4. SKAT_STR.PRE
5. POPCOMP.PRE
6. POPDUMY.PRE
7. POPLANG.PRE
8. POPTABLE.PRE E. Programs to Replace FoxPro's Browse Function.

1. GDM.H
2. GDO.H
3. GPICK.H
4. GPICK.PRE
5. GETKEY.PRE

F. Programs to Maintain Categories/Genres.
  1. GENRE.PRE
  2. GET_LOC.PRE
G. Program to Maintain Users—GETUSER.PRE.
H. Programs to Maintain Keywords.
  1. KEYWORDS.PRE
  2. MAK_KWRD.PRE
I. Program to Maintain Names—NMEMAINT.PRE.
J. Programs to Maintain Production Companies.
  1. PROD.PRE
  2. VPROD.PRE
K. Program to generate reports—REPORTS.PRE.
L. Program to maintain multi-title links—SEE_ALSO.PRE.

We claim:

1. A computerized method for user-interactive searching, retrieving and previewing of multimedia content in a retail environment using hardware and software including an interface configured and arranged for displaying a plurality of input screens and result screens, said input screens for receiving information to be searched from a user's interaction with said interface and said result screens for displaying retrieved data items on said interface, and a computer processor, said method comprising the steps of:

providing a plurality of related databases for storing a plurality of data items, each of said data items being one of text, graphic, image, video, animation and audio data, each of said data items being stored as a record identified by a pointer, each said record having at least one field permitting a plurality of other pointer entries for relating said record to other data items identified by said other pointer entries;

displaying an input screen on the interface for inputting the information to be searched in response to the user's interaction therewith;

identifying whether the information to be searched corresponds to any of said data items;

automatically modifying the information to be searched if no data items corresponding to the information to be searched are identified until at least one data item corresponding to the information to be searched is identified, including identifying searchable terms in said records of data items;

identifying one or more searchable terms in the information to be searched;

performing a Boolean "and" operation on each of said terms in the information and identifying records containing all of said terms in the information;

if no records corresponding to the information are identified by said Boolean "and" operation, performing a Boolean "or" operation on each of said terms in the information and identifying records containing any of said terms in the information;

if no records corresponding to the information are identified by said Boolean "or" operation, performing a "seek" operation in said databases on each of said terms in the information and identifying records containing any of said terms in the information; and if no records corresponding to the information are identified by said "seek" operation, winnowing back each of said terms in the information one character at a time and performing a "seek" operation on each of said winnowed back terms until at least one record corresponding to said winnowed back terms in the information is identified;

retrieving, said at least one data item corresponding to the information to be searched;

displaying said at least one data item corresponding to the information to be searched on a result screen of the interface; and displaying at least one of said other data items identified by said other pointer entries contained in said at least one field of said record of said at least one data item corresponding to the information to be searched.

2. The computerized method of claim 1 wherein the hardware further includes computer memory, and the step of displaying the screens on the interface further comprises the steps of:

displaying a first screen on the interface;

pushing said first screen onto a stack in said memory when a second screen is prompted for display;

displaying said second screen on the interface; and retrieving from said stack and displaying said first screen when said first screen is to be redisplayed.

3. The computerized method of claim 1, wherein said plurality of related databases includes at least one data item having a pointer corresponding to a bitmap and further comprising the steps of:

identifying at least one term in each of said data items;

generating a bitmap of each said identified term identifying whether each of said data items contains said identified term, said bitmap including bits mapping the presence or absence of an association between said identified term and each of said data items;

identifying at least one term in the information to be searched; and reading said bitmap corresponding to said term in the information to be searched to determine all of said data items associated with said term in the information to be searched by identifying bits mapping said presence of an association between said identified term and said data items.

4. The computerized method of claim 1 further comprising the steps of:

compressing at least one of said graphic and image data items using fractalized compression, whereby storage, retrieval and display of said compressed data items is made more efficient.

5. The computerized method of claim 1 further comprising the steps of:

compressing at least one of said video and animation data items using MPEG compression, whereby storage, retrieval and display of said compressed data items is made more efficient.

6. The computerized method of claim 1 further comprising the steps of:

converting analog audio data into digital code for use as a data item and providing a CODEC for playing said digital code as audio output.

7. The computerized method of claim 1 wherein said text data includes information about movies including at least one of titles, names, genres, subjects, awards and ratings.

8. The computerized method of claim 7 wherein said information about movies includes information that the movies are available on at least one of video cassette and laser disk.

9. The computerized method of claim 1 wherein said interface is a touch-screen display monitor.

10. A computerized system for user-interactive, searching, retrieving and previewing of multimedia content in a retail environment using hardware and software including an interface configured and arranged for displaying a plurality of input screens and result screens, said input screens for receiving information to be searched from a user's interaction with said interface and said result screens for displaying retrieved data items on said interface; and a computer processor; said system comprising:

a plurality of related databases for storing a plurality of data items, each of said data items being one of text, graphic, image, video, animation and audio data, each of said data items being stored as a record identified by a pointer, each said record having at least one field permitting a plurality of other pointer entries for relating said record to other data items identified by said other pointer entries;

said system being configured and arranged to display an input screen on the interface for inputting the information to be searched in response to the user's interaction with the interface; identify whether the information to be searched corresponds to any of said data items; automatically modify the information to be searched if no data items corresponding to the information to be searched are identified until at least one data item corresponding to the information to be searched is identified, including identifying searchable terms in said records of data items, identifying one or more searchable terms in the information to be searched, performing a Boolean "and" operation on each of said terms in the information and identifying records containing all of said terms in the information, if no records corresponding to the information are identified by said Boolean "and" operation, performing a Boolean "or" operation on each of said terms in the information and identifying records containing any of said terms in the information, if no records corresponding to the information are identified by said Boolean "or" operation, performing a "seek" operation in said databases on each of said terms in the information and identifying records containing any of said terms in the information, and if no records corresponding to the information are identified by said "seek" operation, winnowing back each of said terms in the information one character at a time and performing a "seek" operation on each of said winnowed back terms until at least one record corresponding to said winnowed back terms in the information is identified; retrieving said at least one data item corresponding to the information to be searched; displaying said at least one data item corresponding to the information to be searched on a result screen on the interface; and displaying at least one of said other data items identified by said other pointer entries contained in said at least one field of said record of said at least one data item corresponding to the information to be searched.

11. The computerized system of claim 10 further comprising computer memory, and wherein the software for displaying the screens on the interface and storing and retrieving the screens from said memory further comprises:

routines for displaying a first screen on the interface;

routines for pushing said first screen onto a stack in said memory when a second screen is prompted for display;

routines for displaying said second screen on the interface; and routines for retrieving from said stack and displaying said first screen.

12. The computerized method of claim 10 wherein the interface comprises a touch-screen display monitor.

* * * * *